United States Patent
Kurasawa et al.

(10) Patent No.: US 9,059,452 B2
(45) Date of Patent: Jun. 16, 2015

(54) ANODE FOR LITHIUM ION SECONDARY BATTERY, LITHIUM ION SECONDARY BATTERY, ELECTRIC POWER TOOL, ELECTRICAL VEHICLE, AND ELECTRIC POWER STORAGE SYSTEM

(75) Inventors: Shunsuke Kurasawa, Fukushima (JP); Takashi Fujinaga, Fukushima (JP); Momoe Adachi, Tokyo (JP); Kenichi Kawase, Fukushima (JP)

(73) Assignee: SONY CORPORATION, Tokyo (JP)

( * ) Notice: Subject to any disclaimer, the term of this patent is extended or adjusted under 35 U.S.C. 154(b) by 385 days.

(21) Appl. No.: 13/015,639

(22) Filed: Jan. 28, 2011

(65) Prior Publication Data

US 2011/0192622 A1   Aug. 11, 2011

(30) Foreign Application Priority Data

Feb. 5, 2010   (JP) ................. P2010-024583

(51) Int. Cl.
| | |
|---|---|
| *H01M 4/13* | (2010.01) |
| *H01M 4/58* | (2010.01) |
| *H01M 4/134* | (2010.01) |
| *H01M 4/36* | (2006.01) |
| *H01M 4/38* | (2006.01) |
| *H01M 4/66* | (2006.01) |
| *H01M 4/70* | (2006.01) |
| *H01M 10/052* | (2010.01) |
| *H01M 10/0525* | (2010.01) |
| *H01M 10/0567* | (2010.01) |
| *H01M 10/0569* | (2010.01) |

(52) U.S. Cl.
CPC .............. *H01M 4/134* (2013.01); *Y02E 60/122* (2013.01); *Y02T 10/7011* (2013.01); *H01M 4/366* (2013.01); *H01M 4/38* (2013.01); *H01M 4/386* (2013.01); *H01M 4/662* (2013.01); *H01M 4/667* (2013.01); *H01M 4/70* (2013.01); *H01M 10/052* (2013.01); *H01M 10/0525* (2013.01); *H01M 10/0567* (2013.01); *H01M 10/0569* (2013.01)

(58) Field of Classification Search
USPC ................. 429/218.1, 223, 224, 231.5, 231.6
See application file for complete search history.

(56) References Cited

U.S. PATENT DOCUMENTS

| | | | | |
|---|---|---|---|---|
| 2006/0115739 A1* | 6/2006 | Yamaguchi et al. | ........... | 429/326 |
| 2008/0020281 A1* | 1/2008 | Kogetsu et al. | ............ | 429/231.5 |
| 2008/0280201 A1* | 11/2008 | Konishiike et al. | ........... | 429/209 |

FOREIGN PATENT DOCUMENTS

| | | |
|---|---|---|
| JP | 2000-036323 | 2/2000 |
| JP | 2001-273892 | 10/2001 |
| JP | 2002-289177 | 10/2002 |
| JP | 2004-349162 | 12/2004 |
| JP | 2007-317419 | 6/2007 |

* cited by examiner

*Primary Examiner* — Ula C Ruddock
*Assistant Examiner* — Daniel Gatewood
(74) *Attorney, Agent, or Firm* — K&L Gates LLP

(57) ABSTRACT

There is provided an anode for a lithium ion secondary battery capable of improving the cycle characteristics, a lithium ion secondary battery using the same, an electric power tool using the lithium ion secondary battery, an electrical vehicle using the lithium ion secondary battery, and an electric power storage system using the lithium ion secondary battery. The anode for a lithium ion secondary battery includes an anode active material layer in which a first layer and a second layer respectively containing silicon and a metal element as an anode active material are alternately layered on an anode current collector, and $1.02 \leq A/B \leq 50$ is satisfied. A represents a silicon content ratio in the anode active material in the first layer, and B represents a silicon content ratio in the anode active material in the second layer.

18 Claims, 10 Drawing Sheets

ANODE FOR LITHIUM ION SECONDARY BATTERY, LITHIUM ION SECONDARY BATTERY, ELECTRIC POWER TOOL, ELECTRICAL VEHICLE, AND ELECTRIC POWER STORAGE SYSTEM

CROSS REFERENCES TO RELATED APPLICATIONS

The present application claims priority to Japanese Patent Application No. JP 2010-024583 filed on Feb. 5, 2010, the entire contents of which are being incorporated herein by reference.

BACKGROUND

The present disclosure relates to an anode for a lithium ion secondary battery that contains an anode active material containing silicon (Si) as an element, a lithium ion secondary battery including the same, an electric power tool using the lithium ion secondary battery, an electrical vehicle using the lithium ion secondary battery, and an electric power storage system using the lithium ion secondary battery.

In recent years, portable electronic devices such as combination cameras (videotape recorder), mobile phones, and notebook personal computers have been widely used, and it is strongly demanded to reduce their size and weight and to achieve their long life. Accordingly, as a power source for the portable electronic devices, a battery, in particular a lightweight secondary battery capable of providing a high energy density has been developed. In recent years, it has been considered to apply such a secondary battery not only to the small electronic devices but also to large electronic devices represented by an electrical vehicle or the like.

Specially, a secondary battery using insertion and extraction of lithium for charge and discharge reaction (so-called lithium ion secondary battery) is extremely prospective, since such a secondary battery is able to provide a higher energy density compared to a lead battery and a nickel cadmium battery.

The lithium ion secondary battery includes an anode having a structure in which an anode active material layer containing an anode active material is provided on an anode current collector. As the anode active material, a carbon material has been widely used. However, in recent years, as the high performance and the multi functions of the portable electronic devices are developed, further improving the battery capacity is demanded. Thus, it has been considered to use silicon instead of the carbon material. Since the theoretical capacity of silicon (4199 mAh/g) is significantly higher than the theoretical capacity of graphite (372 mAh/g), it is expected that the battery capacity is thereby highly improved.

However, in the case where the anode active material layer is formed by depositing silicon as an anode active material by vapor-phase deposition method, the binding characteristics are not sufficient. Thus, if charge and discharge are repeated, there is a possibility that the anode active material layer is intensely expanded and shrunk to be pulverized. If the anode active material layer is pulverized, depending on the pulverization degree, an irreversible lithium oxide is excessively formed resulting from increase of the surface area, and current collectivity is lowered resulting from dropping from the anode current collector. Accordingly, the cycle characteristics as important characteristics of the secondary battery are lowered.

Therefore, to improve the cycle characteristics even when silicon is used as the anode active material, various devices have been invented. Specifically, the technology to form the anode active material layer as a multilayer structure by depositing silicon several times in vapor-phase deposition method has been disclosed (for example, refer to Japanese Unexamined Patent Application Publication No. 2007-317419). In addition, the technology to cover the surface of the anode active material with a metal such as iron, cobalt, nickel, zinc, and copper (for example, refer to Japanese Unexamined Patent Application Publication No. 2000-036323), the technology to diffuse a metal element such as copper not being alloyed with lithium in an anode active material (for example, refer to Japanese Unexamined Patent Application Publication No. 2001-273892), the technology to form a solid solution of copper in an anode active material (for example, refer to Japanese Unexamined Patent Application Publication No. 2002-289177) and the like have been proposed. In addition, the applicant has disclosed the technology that a multilayer structure in which a first layer and a second layer having each different oxygen content are alternately layered is provided, and therefore intense expansion and shrinkage of the anode active material layer are inhibited and structural breakage is inhibited (for example, refer to Japanese Unexamined Patent Application Publication No. 2004-349162).

SUMMARY

The recent portable electronic devices increasingly tend to become small, and the high performance and the multi functions thereof tend to be increasingly developed. Accordingly, there is a tendency that charge and discharge of the secondary battery are frequently repeated, and thus the cycle characteristics are easily lowered. In particular, in the lithium ion secondary battery in which silicon is used as an anode active material to attain a high capacity, the cycle characteristics are easily lowered significantly, being influenced by pulverization of the anode active material layer at the time of the foregoing charge and discharge. Thus, further improvement of the cycle characteristics of the secondary battery is aspired.

It is therefore desirable to provide an anode for a lithium ion secondary battery capable of improving the cycle characteristics, a lithium ion secondary battery using the same, an electric power tool using the foregoing lithium ion secondary battery, an electrical vehicle using the foregoing lithium ion secondary battery, and an electric power storage system using the foregoing lithium ion secondary battery.

According to an embodiment, there is provided an anode for a lithium ion secondary battery that has an anode active material layer in which a first layer and a second layer respectively containing silicon and a metal element as an anode active material are alternately layered on an anode current collector, wherein conditional expression 1 is satisfied. In the expression, A represents a silicon content ratio in the anode active material in the first layer, and B represents a silicon content ratio in the anode active material in the second layer.

$$1.02 \leq A/B \leq 50 \qquad \text{Expression 1}$$

Further, according to an embodiment, there is provided a lithium ion secondary battery including a cathode, the anode for a lithium ion secondary battery of the embodiment, and an electrolyte. Further, according to an embodiment, there is provided an electric power tool, an electrical vehicle, and an electric power storage system that use the foregoing lithium ion secondary battery as a power source or an electric power storage source.

In the anode for a lithium ion secondary battery, the lithium ion secondary battery, the electric power tool, the electrical vehicle, and the electric power storage system of the embodiments, in the anode active material layer, the first layer and the second layer respectively containing silicon and a metal element are alternately layered. In addition, the silicon content ratio in the anode active material in the first layer and the silicon content ratio in the anode active material in the second layer satisfy the specified conditional expression 1. Thereby, stress associated with expansion and shrinkage at the time of charge and discharge in the anode active material layer is relaxed.

According to the anode for a lithium ion secondary battery of the embodiment, the first layer and the second layer as an element of the anode active material layer contain silicon (Si) and the metal element as an anode active material. In addition, the respective silicon content ratios in the respective anode active materials satisfy the conditional expression 1. Thereby, structural break of the anode active material layer is inhibited, contact characteristics between each layer in the laminated structure including the first and the second layers, contact characteristics between the anode active material layer and the anode current collector, and current collectivity are improved. Therefore, in the case where the anode for a lithium ion secondary battery is applied to a lithium ion secondary battery, while a high capacity is realized by using silicon as an anode active material, superior cycle characteristics are also able to be obtained. Further, according to the electric power tool, the electrical vehicle, and the electric power storage system of the embodiments, since the lithium ion secondary battery with superior cycle characteristics is used, usage for longer time period is enabled.

Additional features and advantages are described herein, and will be apparent from the following Detailed Description and the figures.

DETAILED DESCRIPTION

Embodiments will be hereinafter described in detail with reference to the drawings. The description will be given in the following order.

1. First embodiment (anode: example that an anode active material layer is not particulate)
2. Second embodiment (anode: example that an anode active material layer is particulate)
3. Third embodiment (example of a first secondary battery to a third secondary battery including the foregoing anodes)
   3-1. First secondary battery (cylindrical type)
   3-2. Second secondary battery (laminated film type)
   3-3. Third secondary battery (square type)
4. Application of a lithium ion secondary battery

First Embodiment

Structure of an Anode

Figure 1:
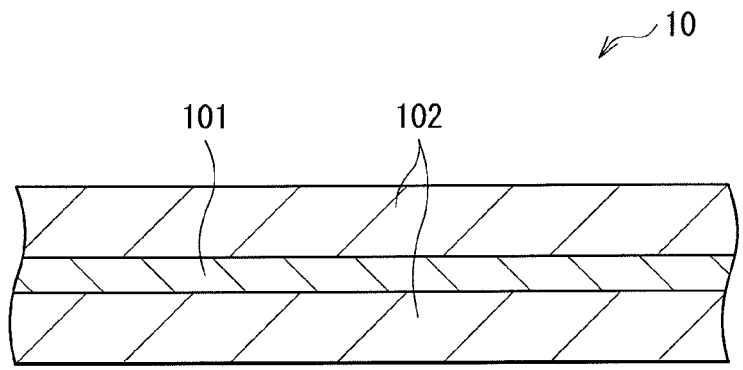
FIG. 1 is a schematic cross sectional view illustrating an anode for a lithium ion secondary battery as a first embodiment.

FIG. 1 illustrates a schematic cross sectional structure of an anode for a lithium ion secondary battery 10 as a first embodiment (hereinafter simply referred to as "anode"). The anode 10 is used for an electrochemical device such as a battery. The anode has, for example, a structure in which an anode active material layer 102 is provided on a surface of an anode current collector 101. The anode active material layer 102 may be provided on both faces of the anode current collector 101 as illustrated in FIG. 1, or may be provided only on a single face of the anode current collector 101.

The anode current collector 101 is preferably made of a metal material having favorable electrochemical stability, favorable electric conductivity, and favorable mechanical strength. Examples of the metal materials include copper (Cu), nickel (Ni), and stainless steel. Specially, copper is preferable as the metal material, since a high electric conductivity is able to be thereby obtained.

In particular, the metal material composing the anode current collector 101 preferably contains one or more metal elements not forming an intermetallic oxide with an electrode reactant. If the intermetallic oxide is formed with the electrode reactant, lowering of the current collectivity characteristics and exfoliation of the anode active material layer 102 from the anode current collector 101 easily occur, since the anode current collector 101 is broken by being affected by a stress due to expansion and shrinkage of the anode active material layer 102 at the time of charge and discharge. Examples of the metal elements include copper, nickel, titanium (Ti), iron (Fe), and chromium (Cr).

Further, the foregoing metal material preferably contains one or more metal elements being alloyed with the anode active material layer 102. Thereby, the contact characteristics between the anode current collector 101 and the anode active material layer 102 are improved, and thus the anode active material layer 102 is hardly exfoliated from the anode current collector 101. For example, in the case that the anode active material of the anode active material layer 102 contains silicon (Si), examples of metal elements that do not form an intermetallic oxide with the electrode reactant and are alloyed with the anode active material layer 102 include copper, nickel, and iron. These metal elements are preferable in view of the strength and the electric conductivity as well.

The anode current collector 101 may have a single layer structure or a multilayer structure. In the case where the anode current collector 101 has the multilayer structure, for example, it is preferable that the layer adjacent to the anode active material layer 102 is made of a metal material being alloyed with the anode active material layer 102, and layers not adjacent to the anode active material layer 2 are made of other metal material.

The surface of the anode current collector 101 is preferably roughened. Thereby, due to the so-called anchor effect, the contact characteristics between the anode current collector 101 and the anode active material layer 102 are improved. In this case, it is enough that at least the surface of the anode current collector 101 opposed to the anode active material layer 102 is roughened. Examples of roughening methods include a method of forming fine particles by electrolytic treatment. The electrolytic treatment is a method of providing concavity and convexity by forming fine particles on the surface of the anode current collector 101 by electrolytic method in an electrolytic bath. A copper foil provided with the electrolytic treatment is generally called "electrolytic copper foil."

Ten point height of roughness profile Rz of the surface of the anode current collector 101 is, for example, preferably from 1.5 μm to 6.5 μm both inclusive, since thereby the contact characteristics between the anode current collector 101 and the anode active material layer 102 are more improved.

Figure 2:
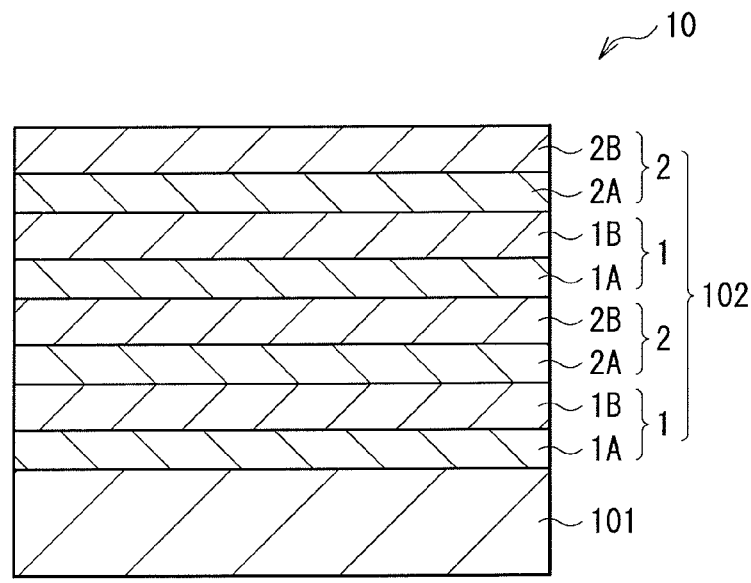
FIG. 2 is a cross sectional view illustrating a detailed structure of the anode active material layer illustrated in FIG. 1.

FIG. 2 illustrates a detailed cross sectional structure of the anode active material layer 102. As illustrated in FIG. 2, the anode active material layer 102 has a multilayer structure in which a first layer 1 and a second layer 2 are repeatedly layered. Both the first layer 1 and the second layer 2 respectively contain an anode active material having silicon (Si) and a metal element X as an element. However, the silicon content ratio in the anode active material of the first layer 1 is different from that of the second layer 2. For example, silicon content ratio A in the anode active material in the first layer 1 and silicon content ratio B in the anode active material in the second layer 2 have a relation satisfying the following conditional expression 1. For example, the silicon content ratio B is from 1.8 atomic % to 88 atomic % both inclusive, and the silicon content ratio A in the anode active material in the first layer is from 70 atomic % to 90 atomic % both inclusive.

$$1.02 \leq A/B \leq 50 \qquad \text{Expression 1}$$

Further, thickness C of the first layer 1 is desirably from 0.04 μm to 16 μm both inclusive, and thickness D of the second layer 2 is desirably from 0.01 μm to 4 μm both inclusive. The thickness C and the thickness D have a relation satisfying the following conditional expression 2.

$$0.1 \leq C/D \leq 40 \qquad \text{Expression 2}$$

The thickness C may be equal to the thickness D, or may be different from the thickness D. FIG. 2 exemplifies the structure in which the first layer 1 and the second layer 2 are alternately layered sequentially from the anode current collector 101 side. However, in this embodiment, a structure having the opposite order, that is, a structure in which the second layer 2 and the first layer 1 are alternately layered from the anode current collector 101 side may be adopted. Further, the number of the first layer 1 and the number of the second layer 2 contained in the multilayer structure are not limited to those illustrated in FIG. 2.

As the metal element X, for example, one or more of nickel, cobalt, iron, manganese (Mn), chromium, titanium, aluminum (Al), magnesium (Mg), and molybdenum (Mo) are desirably contained. Existence of the metal element X in the anode active material contributes to inhibition of expansion and shrinkage of the anode active material layer 102. In particular, by alternately layering the first layer 1 and the second layer 2 with each different composition of silicon and the metal element X, expansion and shrinkage of the anode active material layer 102 are more inhibited.

Silicon as an element of the anode active material has a high ability to insert and extract lithium as an electrode reactant, and therefore a high energy density is able to be obtained.

In the first layer 1 and the second layer 2, silicon may be contained in the anode active material in the form of simple substance, an alloy, or a compound. Alternatively, the anode active material may have one or more phases of simple substance, an alloy, or a compound of silicon at least in part. Such a material may be used singly, or a plurality thereof may be used by mixture. In the embodiment, "the alloy" includes an alloy containing one or more metal elements and one or more metalloid elements, in addition to an alloy composed of two or more metal elements. It is needless to say that the alloy in this embodiment may contain a nonmetallic element. The structure thereof includes a solid solution, a eutectic crystal (eutectic mixture), an intermetallic compound, and a structure in which two or more thereof coexist.

Examples of alloys of silicon include an alloy containing one or more selected from the group consisting of tin (Sn), copper, zinc (Zn), indium (In), silver (Ag), germanium (Ge), bismuth (Bi), antimony (Sb), arsenic (As), and calcium (Ca) in addition to nickel, cobalt, iron, manganese, chromium, titanium, aluminum, magnesium, and molybdenum described above as the metal element X as an element other than silicon. In particular, by adding an appropriate amount of iron, cobalt, nickel, germanium, tin, arsenic, zinc, copper, titanium, chromium, magnesium, calcium, aluminum, or silver as other element to the anode active material, energy density is possibly more improved than in the anode active material composed of silicon simple substance.

Examples of compounds of silicon include a compound having carbon (C) as an element other than silicon. The compound of silicon may contain, for example, one or more of the foregoing other elements as an element other than silicon.

The anode active material layer 102 is formed by, for example, using coating method, vapor-phase deposition method, liquid-phase deposition method, spraying method, firing method, or a combination of two or more of these methods. In particular, the anode active material layer 102 is preferably formed through a plurality of deposition steps by using vapor-phase deposition method, and the anode active material layer 102 and the anode current collector 101 are preferably alloyed in at least part of the interface thereof. Specifically, at the interface thereof, the element of the anode current collector 101 may be diffused in the anode active material layer 102; or the element of the anode active material layer 102 may be diffused in the anode current collector 101; or these elements may be diffused in each other. Thereby, breakage of the anode active material layer 102 due to expansion and shrinkage at the time of charge and discharge hardly occurs, and the electron conductivity between the anode current collector 101 and the anode active material layer 102 is improved.

The metal element X is able to be taken in the anode active material by using an evaporation source in which the metal element X is mixed or by using multiple evaporation sources in depositing the anode active material by using evaporation method as vapor-phase deposition method, for example. It is able to respectively form the first layer 1 and the second layer 2 having each desirable composition ratio by using two evaporation sources with each different composition ratio between silicon and the metal element X, or by changing the evaporation amount from each element evaporation source in the case of using the multiple evaporation sources.

For example, in the case where the anode active material is deposited by using vapor-phase deposition method, oxygen gas or nitrogen gas may be introduced into a chamber continuously.

Examples of vapor-phase deposition method include physical deposition method and chemical deposition method. More specific examples include vacuum evaporation method, sputtering method, ion plating method, laser ablation method, thermal CVD (Chemical Vapor Deposition) method, plasma CVD method, and spraying method. As liquid-phase deposition method, a known technique such as electric plating and electroless plating is able to be used. Firing method is, for example, a method in which a particulate anode active material mixed with a binder or the like is dispersed in a solvent and the anode current collector is coated with the resultant, and heat treatment is subsequently provided at temperature higher than the melting point of the binder or the like. Examples of firing method include a known technique such as atmosphere firing method, reactive firing method, and hot press firing method.

The anode active material layer 102 has a multilayer structure, and therefore internal stress of the anode active material layer resulting from expansion and shrinkage of the anode active material at the time of charge and discharge is more easily relaxed. Further, in the case where the deposition step of the anode active material layer 102 is divided into a plurality of times (the first layer 1 and the second layer 2 are sequentially formed and layered) in forming the anode active material layer 102 by using evaporation method or the like associated with high heat at the time of forming a film, the following advantage is obtained. That is, compared to a case that the anode active material layer 102 having a single layer structure is formed in one time deposition treatment, time that the anode current collector 101 is exposed at high heat is able to be shortened, and thermal damage to the anode current collector 101 is able to be decreased.

Manufacturing Method of the Anode

The anode 10 is manufactured, for example, by the following procedure. Specifically, first, the anode current collector 101 is prepared, and the surface of the anode current collector 101 is provided with roughening treatment according to needs. After that, the first layer 1 and the second layer 2 containing the foregoing anode active material are sequentially deposited a plurality of times on the surface of the anode current collector 101 by using the foregoing method such as vapor-phase deposition method to form the anode active material layer 102 having a multilayer structure. If vapor-phase deposition method is used, the anode active material may be deposited while the anode current collector 101 is fixed, or the anode active material may be deposited while the anode current collector 101 is rotated.

Action and Effect of this Embodiment

As described above, in the anode 10 of this embodiment, both the first layer 1 and the second layer 2 as an element of the anode active material layer 102 contain silicon and the metal element X as an anode active material, and each silicon content ratio in each anode active material satisfies the conditional expression 1. With such a structure, stress resulting from expansion and shrinkage at the time of charge and discharge in the anode active material layer 102 is relaxed. Therefore, structural breakage of the anode active material layer 102 is inhibited, contact characteristics between each layer in the laminated structure, contact characteristics between the anode active material layer 102 and the anode current collector 101, and current collectivity are improved. Therefore, in the case where the anode 10 is applied to a lithium ion secondary battery, while a high capacity is realized by using silicon as an anode active material, superior cycle characteristics are also able to be obtained.

2. Second Embodiment

Structure of an Anode

Figure 3:
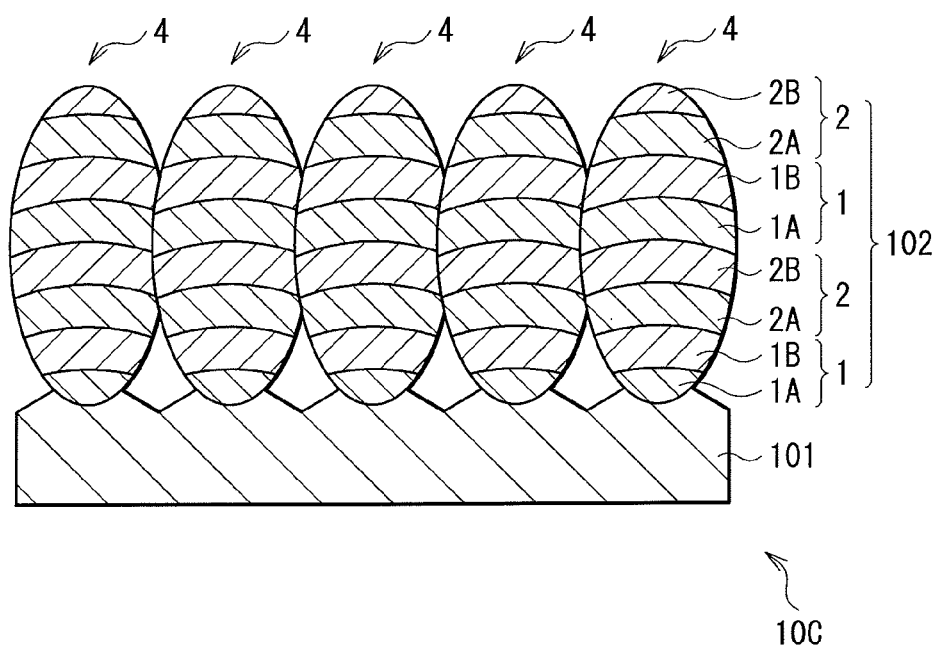
FIG. 3 is a schematic cross sectional view illustrating an anode for a lithium ion secondary battery as a second embodiment.

FIG. 3 schematically illustrates a cross sectional structure of a main section of an anode 10C as a second embodiment. The anode 10C is used for a lithium ion secondary battery as the anode 10 of the foregoing first embodiment is. In the following description, structures, actions, and effects of the elements substantially identical with those of the foregoing anode 10 will be omitted.

As illustrated in FIG. 3, the anode 10C has a structure in which an anode active material layer 102A containing a plurality of anode active material particles 4 is provided on the anode current collector 101. The respective anode active material particles 4 have a multilayer structure in which the first layer 1 and the second layer 2 composed of an anode active material similar to that of the first embodiment are layered. The multilayer structure extends in the thickness direction of the anode active material layer 102A so that the multilayer structure stands on the anode current collector 101. Further, the anode active material layer 102A may be provided on both faces of the anode current collector 101 as in the foregoing first embodiment, or may be provided on only one face thereof.

Manufacturing Method of the Anode

The anode active material particles 4 are formed by, for example, one of vapor-phase deposition method, liquid-phase deposition method, spraying method, and firing method, or two or more methods thereof as in the foregoing first embodiment. In particular, vapor-phase deposition method is preferably used, since thereby the anode current collector 101 and the anode active material particles 4 are easily alloyed in the interface thereof. Alloying may be made by diffusing an element of the anode current collector 101 into the anode active material particles 4; or vice versa. Alternatively, alloying may be made by diffusion of the element of the anode current collector 101 and silicon as an element of the anode active material particles 4 into each other. With such alloying, structural breakage of the anode active material particles 4 resulting from expansion and shrinkage at the time of charge and discharge is inhibited, and the electric conductivity between the anode current collector 101 and the anode active material particles 4 is improved.

Action and Effect of this Embodiment

As described above, in this embodiment, the anode active material particles 4 structuring the anode active material layer 102A provided on the anode current collector 101 are formed as the laminated structure composed of the first layer 1 and the second layer 2. Thereby, stress generated by expansion and shrinkage at the time of charge and discharge in the anode active material layer 102A is relaxed. Therefore, structural breakage of the anode active material layer 102A is inhibited, contact characteristics between each layer in the laminated structure, contact characteristics between the anode active material layer 102A and the anode current collector 101, and current collectivity are improved. Therefore, effect similar to that of the foregoing first embodiment is obtained.

3. Third Embodiment

Next, a description will be given of usage examples of the anodes 10 and 10C described in the foregoing first and the second embodiments. A description will be given, as an example, taking a first secondary battery to a third secondary battery as a lithium ion secondary battery for which the anodes 10 and 10C are used.

3-1. First Secondary Battery (Cylindrical Type)

Figure 4:
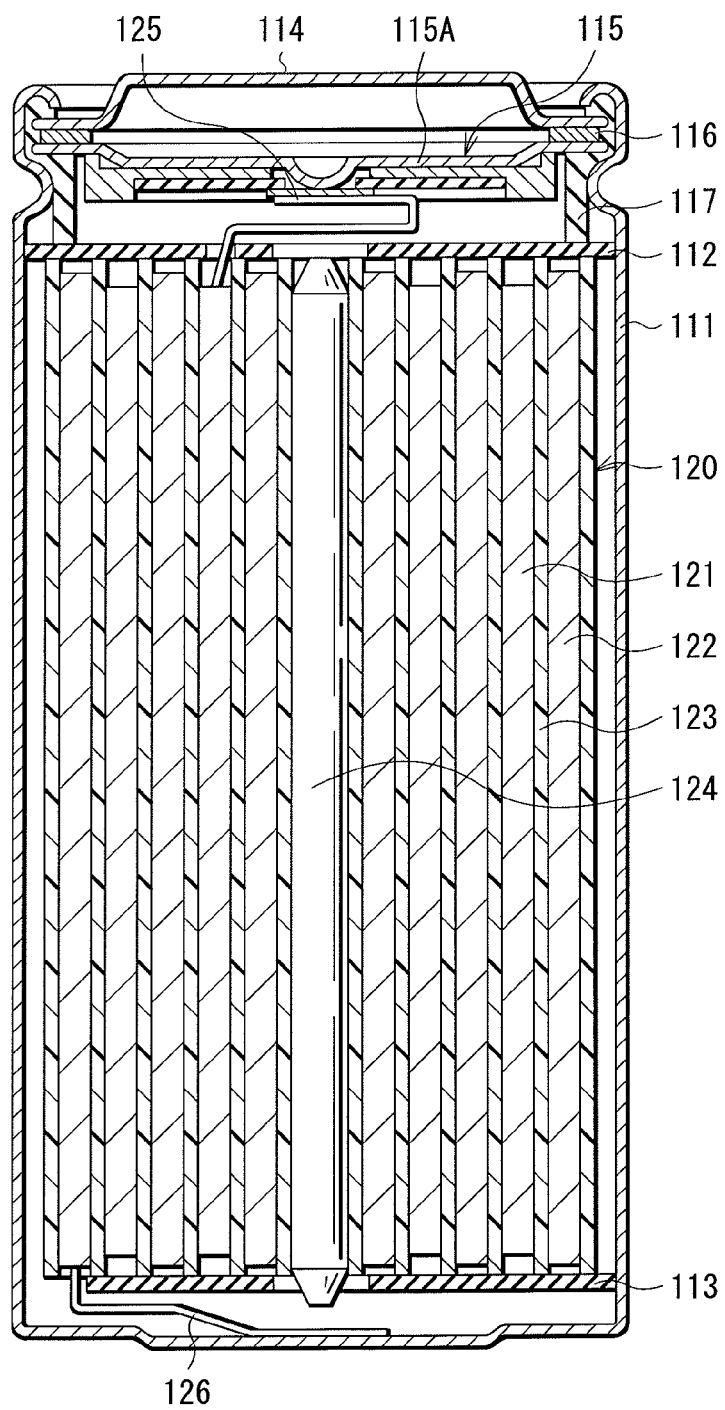
FIG. 4 is a cross sectional view illustrating a structure of a first secondary battery using the anode for a lithium ion secondary battery.
Figure 5:
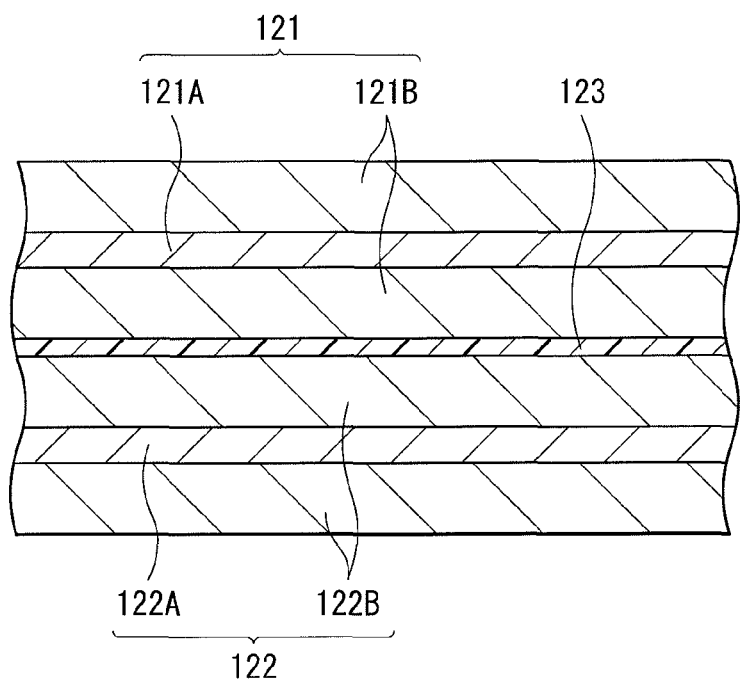
FIG. 5 is a cross sectional view illustrating an enlarged part of the wound electrode body illustrated in FIG. 4.

FIG. 4 and FIG. 5 illustrate a cross sectional structure of a first secondary battery. FIG. 5 illustrates an enlarged part of a wound electrode body 120 illustrated in FIG. 4. The secondary battery herein described is, for example, a lithium ion secondary battery in which, for example, a capacity of an anode 122 is expressed based on insertion and extraction of lithium.

Whole Structure of the First Secondary Battery

The secondary battery mainly contains the wound electrode body 120 in which a cathode 121 and the anode 122 are layered with a separator 123 in between and spirally wound, and a pair of insulating plates 112 and 113 inside of a battery can 111 in the shape of an approximately hollow cylinder. The battery structure including the battery can 111 is a so-called cylindrical type.

The battery can 111 is made of, for example, a metal material such as iron, aluminum, or an alloy thereof. One end of the battery can 111 is closed, and the other end of the battery can 111 is opened. The pair of insulating plates 112 and 113 is arranged to sandwich the wound electrode body 120 in between and to extend perpendicularly to the wound periphery face.

At the open end of the battery can 111, a battery cover 114, and a safety valve mechanism 115 and a PTC (Positive Temperature Coefficient) device 116 provided inside of the battery cover 114 are attached by being caulked with a gasket 117. Inside of the battery can 111 is thereby hermetically sealed. The battery cover 114 is made of, for example, a material similar to that of the battery can 111. The safety valve mechanism 115 is electrically connected to the battery cover 114 through the PTC device 116. In the safety valve mechanism 115, in the case where the internal pressure becomes a certain level or more by internal short circuit, external heating or the like, a disk plate 115A inverts to cut the electric connection between the battery cover 114 and the wound electrode body 120. As temperature rises, the PTC device 116 increases the resistance and thereby limits a current to prevent abnormal heat generation resulting from a large current. The gasket 117 is made of, for example, an insulating material. The surface of the gasket 117 is coated with asphalt.

A center pin 124 may be inserted in the center of the wound electrode body 120. In the wound electrode body 120, a cathode lead 125 made of a metal material such as aluminum is connected to the cathode 121, and an anode lead 126 made of a metal material such as nickel is connected to the anode 122. The cathode lead 125 is electrically connected to the battery cover 114 by being welded to the safety valve mechanism 115. The anode lead 126 is welded and thereby electrically connected to the battery can 111.

Cathode

The cathode 121 has a structure in which, for example, a cathode active material layer 121B is provided on both faces of a cathode current collector 121A having a pair of faces. The cathode current collector 121A is made of a metal material such as aluminum, nickel, and stainless steel. The cathode active material layer 121B contains a cathode active material, and may contain other material such as a binder and an electrical conductor according to needs.

The cathode active material contains one or more cathode materials capable of inserting and extracting lithium as an electrode reactant. As the cathode material, for example, a lithium-containing compound is preferable, since thereby a high energy density is able to be obtained. Examples of the lithium-containing compound include a composite oxide containing lithium and a transition metal element and a phosphate compound containing lithium and a transition metal element. Specially, a compound containing one or more selected from the group consisting of cobalt, nickel, manganese, and iron as a transition metal element is preferable, since thereby a higher voltage is able to be obtained. The chemical expression thereof is expressed by, for example, $Li_xM1O_2$ or $Li_yM2PO_4$. In the expression, M1 and M2 represent one or more transition metal elements. Values of x and y vary according to the charge and discharge state of the secondary battery, and are generally in the range of $0.05 \leq x \leq 1.10$ and $0.05 \leq y \leq 1.10$.

Examples of composite oxides containing lithium and a transition metal element include a lithium cobalt composite oxide ($Li_xCoO_2$), a lithium nickel composite oxide ($Li_xNiO_2$), a lithium nickel cobalt composite oxide ($Li_xNi_{(1-z)}Co_zO_2(z<1)$), a lithium nickel cobalt manganese composite oxide ($Li_xNi_{(1-v-w)}Co_vMn_wO_2$) ($v+w<1$)), and lithium manganese composite oxide having a spinel structure ($LiMn_2O_4$). Specially, a composite oxide containing nickel is preferable, since thereby a high capacity is obtained and superior cycle characteristics are obtained. Further, examples of phosphate compounds containing lithium and a transition metal element include lithium iron phosphate compound ($LiFePO_4$) and a lithium iron manganese phosphate compound ($LiFe_{(1-u)}Mn_uPO_4$ ($u<1$)).

In addition, examples of cathode materials include an oxide, a disulfide, a chalcogenide, and a conductive polymer. Examples of oxides include titanium oxide, vanadium oxide, and manganese dioxide. Examples of disulfides include titanium disulfide and molybdenum sulfide. Examples of chalcogenide include niobium selenide. Examples of conductive polymers include sulfur, polyaniline and polythiophene.

It is needless to say that the cathode material may be a material other than the foregoing compounds. Further, two or more of the foregoing cathode materials may be used by mixture voluntarily.

Examples of cathode binders include a synthetic rubber such as styrene-butadiene rubber, fluorine system rubber, and ethylene propylenediene, and a polymer material such as polyvinylidene fluoride. One thereof may be used singly, or a plurality thereof may be used by mixture.

Examples of cathode electrical conductors include a carbon material such as graphite, carbon black, acetylene black, and Ketjen black. One thereof may be used singly, or a plurality thereof may be used by mixture. The cathode electrical conductor may be a metal material, a conductive polymer or the like as long as the material has electric conductivity.

Anode

The anode 122 has a structure similar to that of the foregoing anode 10, 10A, 10B, or 10C. For example, in the anode 122, an anode active material layer 122B is provided on both faces of an anode current collector 122A having a pair of faces. The structures of the anode current collector 122A and the anode active material layer 122B are respectively similar to the structures of the anode current collector 101 and the anode active material layer 102 in the foregoing anode. In the anode 122, the chargeable capacity of the anode material capable of inserting and extracting lithium is preferably larger than the discharge capacity of the cathode 121. Thereby, at the time of full charge, there is low possibility that lithium is precipitated as dendrite on the anode 122.

Separator

The separator 123 separates the cathode 121 from the anode 122, and passes lithium ions while preventing current short circuit due to contact of both electrodes. The separator 123 is made of, for example, a porous film composed of a synthetic resin such as polytetrafluoroethylene, polypropylene, and polyethylene, or a ceramics porous film. The separator 123 may have a structure in which two or more porous films are layered. Specially, a porous film made of polyolefin is preferable, since such a film has superior short circuit preventive effect, and is able to achieve safety improvement of the secondary battery by shutdown effect. In particular, polyethylene is preferable since shutdown effect is able to be thereby obtained at from 100 degrees Celsius to 160 degrees Celsius both inclusive and its electrochemical stability is excellent. Further, polypropylene is also preferable. In addition, a copolymer of polyethylene and polypropylene or a blended material thereof may be used as long as such a material has chemical stability.

Electrolytic Solution

An electrolytic solution as a liquid electrolyte is impregnated in the separator 123. The electrolytic solution contains a solvent and an electrolyte salt dissolved therein.

The solvent contains, for example, one or more nonaqueous solvents such as an organic solvent. The solvents (nonaqueous solvents) described below may be used singly or two or more thereof may be used by mixture.

Examples of nonaqueous solvents include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethylacetic acid methyl, trimethylacetic acid ethyl, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. By using such a nonaqueous solvent, a superior battery capacity, superior cycle characteristics, superior storage characteristics and the like are obtained.

Specially, one or more of ethylene carbonate, propylene carbonate, dimethyl carbonate, diethyl carbonate, and ethyl methyl carbonate are preferable. By using such a nonaqueous solvent, a superior battery capacity, superior cycle characteristics, superior storage characteristics and the like are obtained. In this case, a mixture of a high viscosity (high dielectric constant) solvent (for example, specific inductive $\in \geq 30$) such as ethylene carbonate and propylene carbonate and a low viscosity solvent (for example, viscosity≤1 mPa·s) such as dimethyl carbonate, ethylmethyl carbonate, and diethyl carbonate is more preferable. Thereby, dissociation characteristics of the electrolyte salt and ion mobility are improved.

In particular, the solvent preferably contains one or both of a halogenated chain ester carbonate and a halogenated cyclic ester carbonate. Thereby, a stable protective film is formed on the surface of the anode 122 at the time of charge and discharge, and thus decomposition reaction of the electrolytic solution is inhibited. The halogenated chain ester carbonate is a chain ester carbonate having halogen as an element. More specifically, at least part of hydrogen in the chain ester carbonate is substituted with halogen. Further, the halogenated cyclic ester carbonate is a cyclic ester carbonate containing halogen as an element. More specifically, at least part of hydrogen in the cyclic ester carbonate is substituted with halogen.

The halogen type is not particularly limited, but specially, fluorine, chlorine, or bromine is preferable, and fluorine is more preferable since thereby higher effect is obtained compared to other halogen. The number of halogen is more preferably two than one, and further may be three or more, since thereby an ability to form a protective film is improved, and a more rigid and more stable protective film is formed. Accordingly, decomposition reaction of the electrolytic solution is more inhibited.

Examples of the halogenated chain ester carbonate include fluoromethyl methyl carbonate, bis(fluoromethyl)carbonate, and difluoromethyl methyl carbonate. Examples of the halogenated cyclic ester carbonate include 4-fluoro-1,3-dioxolane-2-one and 4,5-difluoro-1,3-dioxolane-2-one. Halogenated cyclic ester carbonate includes a geometric isomer as well. Contents of the halogenated chain ester carbonate and the halogenated cyclic ester carbonate in the solvent is, for example, from 0.01 wt % to 50 wt % both inclusive.

Further, the solvent preferably contains an unsaturated carbon bond cyclic ester carbonate. Thereby, a stable protective film is formed on the surface of the anode 42 at the time of charge and discharge, and thus decomposition reaction of the electrolytic solution is inhibited. The unsaturated carbon bond cyclic ester carbonate is a cyclic ester carbonate having an unsaturated carbon bond. More specifically, unsaturated carbon bond is introduced to a given location of the cyclic ester carbonate. Examples of the unsaturated carbon bond cyclic ester carbonate include vinylene carbonate and vinylethylene carbonate. Contents of the unsaturated carbon bond cyclic ester carbonate in the solvent is, for example, from 0.01 wt % to 10 wt % both inclusive.

Further, the solvent preferably contains sultone (cyclic sulfonic ester), since thereby chemical stability of the electrolytic solution is improved. Examples of the sultone include propane sultone and propene sultone. The sultone content in the solvent is, for example, from 0.5 wt % to 5 wt % both inclusive.

Further, the solvent preferably contains an acid anhydride since chemical stability of the electrolytic solution is thereby improved. Examples of acid anhydrides include carboxylic anhydride, disulfonic anhydride, and carboxylic sulfonic anhydride. Examples of carboxylic anhydrides include succinic anhydride, glutaric anhydride, and maleic anhydride. Examples of disulfonic anhydrides include ethane disulfonic anhydride and propane disulfonic anhydride. Examples of carboxylic sulfonic anhydrides include sulfobenzoic anhydride, sulfopropionic anhydride, and sulfobutyric anhydride. The content of the acid anhydride in the solvent is, for example, from 0.5 wt % to 5 wt % both inclusive.

The electrolyte salt contains, for example, one or more light metal salts such as a lithium salt. The electrolyte salts described below may be used singly or two or more thereof may be used by mixture.

Examples of lithium salts include the following. That is, examples thereof include lithium hexafluorophosphate ($LiPF_6$), lithium tetrafluoroborate ($LiBF_4$), lithium perchlorate ($LiClO_4$), and lithium hexafluoroarsenate ($LiAsF_6$). Further, examples thereof include lithium tetraphenylborate ($LiB(C_6H_5)_4$), lithium methanesulfonate ($LiCH_3SO_3$), lithium trifluoromethane sulfonate ($LiCF_3SO_3$), and lithium tetrachloroaluminate ($LiAlCl_4$). Further, examples thereof include dilithium hexafluorosilicate ($Li_2SiF_6$), lithium chloride (LiCl), and lithium bromide (LiBr). In the case of using the foregoing material, superior battery capacity, superior cycle characteristics, superior storage characteristics and the like are obtained.

Specially, one or more of lithium hexafluorophosphate, lithium tetrafluoroborate, lithium perchlorate, and lithium hexafluoroarsenate are preferable. Further, lithium hexafluorophosphate and lithium tetrafluoroborate are more preferable, and lithium hexafluorophosphate is most preferable, since the internal resistance is thereby lowered, more superior effect is obtained.

The content of the electrolyte salt to the solvent is preferably from 0.3 mol/kg to 3.0 mol/kg both inclusive, since thereby high ion conductivity is obtained.

The electrolytic solution may contain various additives together with the solvent and the electrolyte salt, since thereby chemical stability of the electrolytic solution is more improved.

Examples of additives include sultone (cyclic ester sulfonate). Examples of sultone include propane sultone and propene sultone. Specially, propene sultone is preferable. Such sultone may be used singly, or a plurality thereof may be used by mixture.

Examples of additives include an acid anhydride. Examples of acid anhydrides include carboxylic anhydride such as succinic anhydride, glutaric anhydride, and maleic anhydride; disulfonic anhydride such as ethane disulfonic anhydride and propane disulfonic anhydride; and an anhydride of carboxylic acid and sulfonic acid such as sulfobenzoic anhydride, sulfopropionic anhydride, and sulfobutyric anhydride. Specially, sulfobenzoic anhydride or sulfopropionic anhydride is preferable. The anhydrides may be used singly, or a plurality thereof may be used by mixture.

Manufacturing Method of the Secondary Battery

The secondary battery is manufactured, for example, by the following procedure.

First, the cathode 121 is formed. First, a cathode active material, and if necessary, a cathode binder, a cathode electrical conductor or the like are mixed to prepare a cathode mixture, which is dispersed in an organic solvent to form a paste cathode mixture slurry. Subsequently, both faces of the cathode current collector 121A are uniformly coated with the cathode mixture slurry, which is dried to form the cathode active material layer 121B. Finally, the cathode active material layer 121B is compression-molded by using a rolling press machine or the like while being heated if necessary. In this case, the resultant may be compression-molded over several times.

Next, the anode 122 is formed by a procedure similar to that of the foregoing anode 10 or the like. In this case, after the anode current collector 122A is prepared, the anode active material layer 122B is formed by sequentially forming the first layer 1 and the second layer 2 on both faces of the anode current collector 122A.

Finally, the secondary battery is assembled by using the cathode 121 and the anode 122. First, the cathode lead 125 is attached to the cathode current collector 121A by welding or the like, and the anode lead 126 is attached to the anode current collector 122A by welding or the like. Subsequently, the cathode 121 and the anode 122 are layered with the separator 123 in between and spirally wound, and thereby the wound electrode body 120 is formed. After that, the center pin 124 is inserted in the center of the wound electrode body. Subsequently, the wound electrode body 120 is sandwiched between the pair of insulating plates 112 and 113, and contained in the battery can 111. In this case, the cathode lead 125 is attached to the safety valve mechanism 115 by welding or the like, and the anode lead 126 is attached to the battery can 111 by welding or the like. Subsequently, the electrolytic solution is injected into the battery can 111 and impregnated in the separator 123. Finally, the battery cover 114, the safety valve mechanism 115, and the PTC device 116 are attached to the open end of the battery can 111 by being caulked with the gasket 117. Thereby, the secondary battery illustrated in FIG. 4 and FIG. 5 is completed.

Operation of the Secondary Battery

In the secondary battery, when charged, for example, lithium ions are extracted from the cathode 121 and inserted in the anode 122 through the electrolytic solution impregnated in the separator 123. Meanwhile, when discharged, for example, lithium ions are extracted from the anode 122, and inserted in the cathode 121 through the electrolytic solution impregnated in the separator 123.

Effect of the Secondary Battery

According to the first secondary battery, the anode 122 has the structure similar to that of the anode 10 illustrated in FIG. 1. Thus, the cycle characteristics are able to be improved while a high capacity is obtained. Effects of the first secondary battery other than the foregoing effects are similar to those of the foregoing anode 10.

3-2. Second Secondary Battery (Laminated Film Type)

Figure 6:
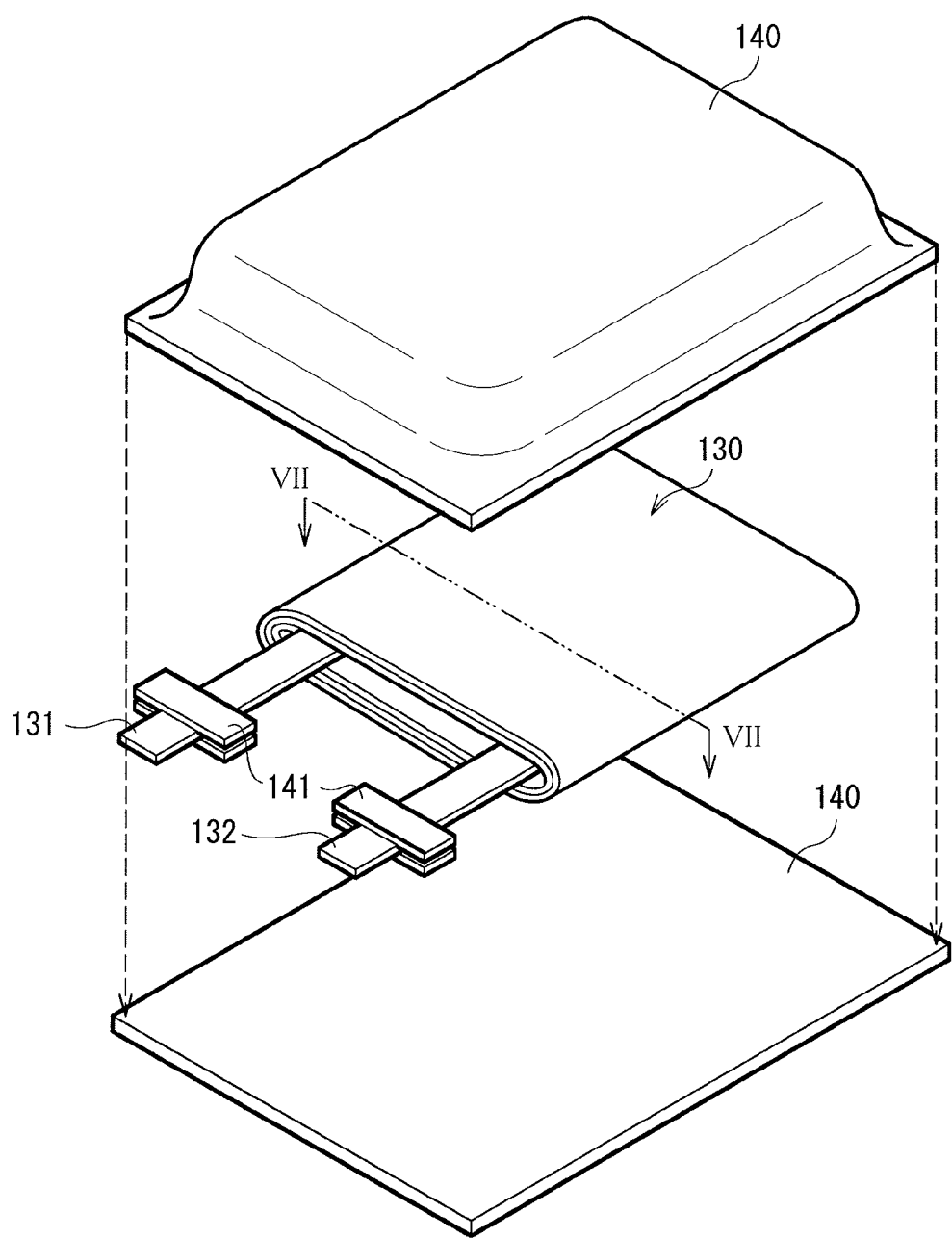
FIG. 6 is an exploded perspective view illustrating a structure of a second secondary battery using the anode for a lithium ion secondary battery.
Figure 7:
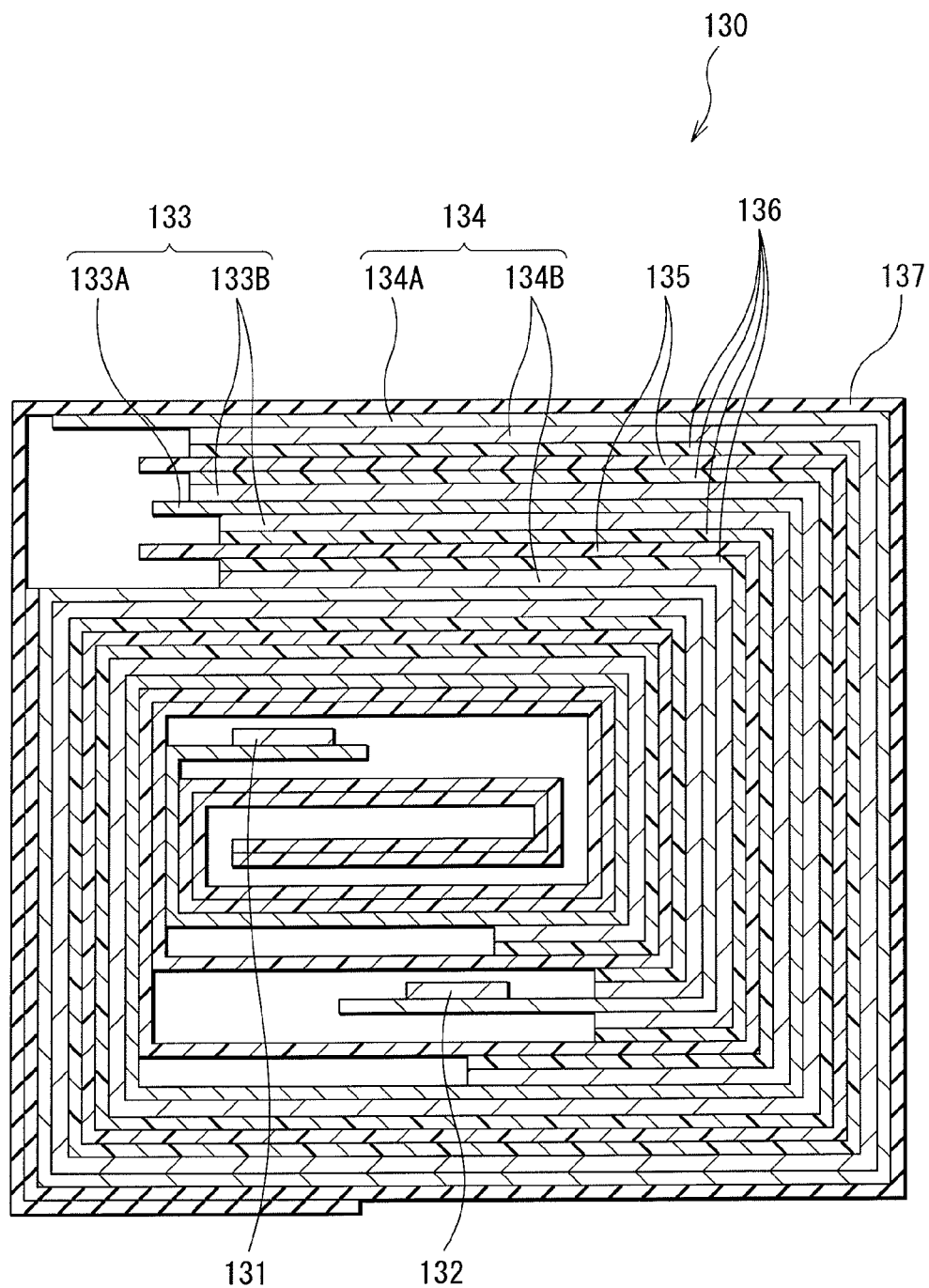
FIG. 7 is a cross sectional view illustrating a structure taken along line VII-VII of the wound electrode body illustrated in FIG. 6.

FIG. 6 illustrates an exploded perspective structure of a second secondary battery. FIG. 7 illustrates an exploded cross section taken along line VII-VII of a wound electrode body 130 illustrated in FIG. 6.

The secondary battery is, for example, a lithium ion secondary battery as the first secondary battery. In the second secondary battery, the wound electrode body 130 on which a cathode lead 131 and an anode lead 132 are attached is contained in a film package member 140. The battery structure using the package member 140 is so-called laminated film type.

The cathode lead 131 and the anode lead 132 are respectively directed from inside to outside of the package member 140 in the same direction, for example. However, provision positions of the cathode lead 131 and the anode lead 132 in relation to the wound electrode body 130, the derivation direction thereof and the like are not particularly limited. The cathode lead 131 is made of, for example, aluminum or the like, and the anode lead 132 is made of, for example, copper, nickel, stainless steel or the like. These materials are in the shape of a thin plate or mesh.

The package member 140 is a laminated film in which, for example, a fusion bonding layer, a metal layer, and a surface protective layer are layered in this order. In this case, for example, the respective outer edges in the fusion bonding layer of two films are bonded with each other by fusion bonding, an adhesive or the like so that the fusion bonding layer and the wound electrode body 130 are opposed to each other. Examples of fusion bonding layers include a film made of polyethylene, polypropylene or the like. Examples of metal layers include an aluminum foil. Examples of surface protective layers include a film made of nylon, polyethylene terephthalate or the like.

Specially, as the package member 140, an aluminum laminated film in which a polyethylene film, an aluminum foil, and a nylon film are layered in this order is preferable. However, the package member 140 may be made of a laminated film having other laminated structure, a polymer film such as polypropylene, or a metal film instead of the foregoing aluminum laminated film.

An adhesive film 141 to protect from outside air intrusion is inserted between the package member 140 and the cathode lead 131, and between the package member 140 and the anode lead 132. The adhesive film 141 is made of a material having contact characteristics with respect to the cathode lead 131 and the anode lead 132. Examples of such a material include, for example, a polyolefin resin such as polyethylene, polypropylene, modified polyethylene, and modified polypropylene.

In the wound electrode body 130, as illustrated in FIG. 7, a cathode 133 and an anode 134 are layered with a separator 135 and an electrolyte layer 136 in between and spirally wound. The outermost periphery thereof is protected by a protective tape 137. The cathode 133 has a structure in which, for example, a cathode active material layer 133B is provided on both faces of a cathode current collector 133A. The anode 134 has a structure in which, for example, an anode active material layer 134B is provided on both faces of an anode current collector 134A.

Figure 8:
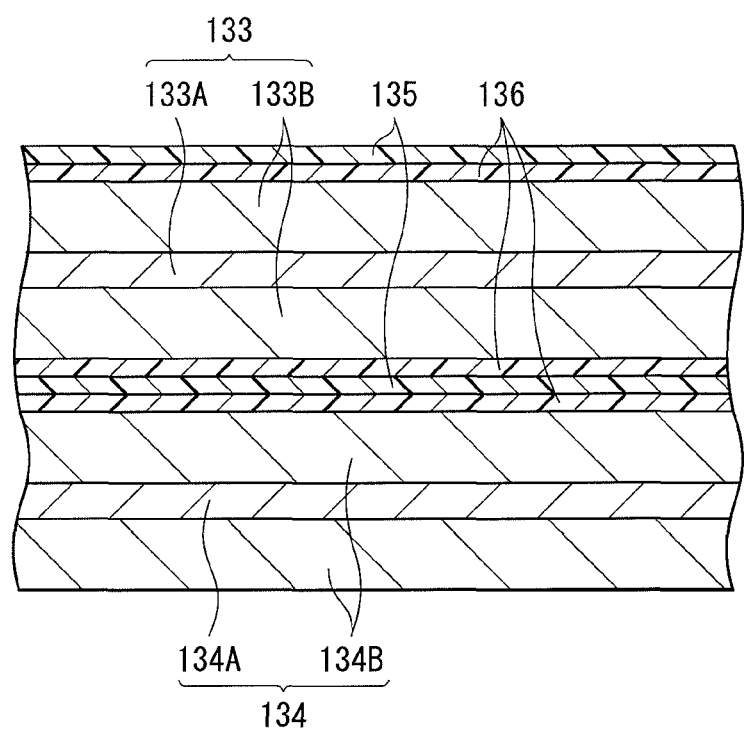
FIG. 8 is a cross sectional view illustrating an enlarged part of the wound electrode body illustrated in FIG. 7.

FIG. 8 illustrates an enlarged part of the wound electrode body 130 illustrated in FIG. 7. The cathode 133 has a structure in which, for example, the cathode active material layer 133B is provided on both faces of the cathode current collector 133A having a pair of faces. The anode 134 has a structure similar to that of the foregoing anode in which, for example, the anode active material layer 134B is provided on both faces of the anode current collector 134A having a pair of faces. The structures of the cathode current collector 133A, the cathode active material layer 133B, the anode current collector 134A, the anode active material layer 134B, and the separator 135 are respectively similar to those of the cathode current collector 121A, the cathode active material layer 121B, the anode current collector 122A, the anode active material layer 122B, and the separator 123 in the foregoing first secondary battery.

In the electrolyte layer 136, an electrolytic solution is held by a polymer compound. The electrolyte layer 136 may contain other material such as various additives according to needs. The electrolyte layer 136 is a so-called gel electrolyte. The gel electrolyte is preferable, since high ion conductivity (for example, 1 mS/cm or more at room temperature) is obtained and liquid leakage of the electrolytic solution is prevented.

Examples of polymer compounds include one or more of the following polymer materials. That is, examples thereof include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Further, examples thereof include a copolymer of vinylidene fluoride and hexafluoro propylene. Such a compound may be used singly, or a plurality thereof may be used by mixture. Specially, polyvinylidene fluoride or the copolymer of vinylidene fluoride and hexafluoro propylene is preferable, since such a polymer compound is electrochemically stable.

The composition of the electrolytic solution is similar to the composition of the electrolytic solution in the first secondary battery. However, in the electrolyte layer 136 as the gel electrolyte, a solvent of the electrolytic solution means a wide concept including not only the liquid solvent but also a material having ion conductivity capable of dissociating the electrolyte salt. Therefore, in the case where the polymer compound having ion conductivity is used, the polymer compound is also included in the solvent.

Instead of the gel electrolyte layer 136 in which an electrolytic solution is held by the polymer compound, the electrolytic solution may be directly used. In this case, the electrolytic solution is impregnated in the separator 135.

The secondary battery including the gel electrolyte layer 136 is manufactured, for example, by the following three procedures.

In the first manufacturing method, first, the cathode 133 and the anode 134 are formed by procedures similar to those of the cathode 121 and the anode 122 in the first secondary battery. Specifically, the cathode 133 is formed by forming the cathode active material layer 133B on both faces of the cathode current collector 133A, and the anode 134 is formed by forming the anode active material layer 134B on both faces of the anode current collector 134A. Subsequently, a precursor solution containing an electrolytic solution, a polymer compound, and a solvent is prepared. After the cathode 133 and the anode 134 are coated with the precursor solution, the solvent is volatilized to form the gel electrolyte layer 136. Subsequently, the cathode lead 131 is attached to the cathode current collector 133A by welding or the like, and the anode lead 132 is attached to the anode current collector 134A by welding or the like. Subsequently, the cathode 133 and the anode 134 provided with the electrolyte layer 136 are layered with the separator 135 in between and spirally wound. After that, the protective tape 137 is adhered to the outermost periphery thereof to form the wound electrode body 130. Finally, after the wound electrode body 130 is sandwiched between 2 pieces of the film package members 140, outer edges of the package members 140 are bonded by thermal fusion bonding or the like to enclose the wound electrode body 130. At this time, the adhesive films 141 are inserted between the cathode lead 131, the anode lead 132 and the package member 140. Thereby, the secondary battery illustrated in FIG. 6 to FIG. 8 is completed.

In the second manufacturing method, first, the cathode lead 131 is attached to the cathode 133, and the anode lead 132 is attached to the anode 134. Subsequently, the cathode 133 and the anode 134 are layered with the separator 135 in between and spirally wound. After that, the protective tape 137 is adhered to the outermost periphery thereof, and thereby a wound body as a precursor of the wound electrode body 130 is formed. Subsequently, after the wound body is sandwiched between 2 pieces of the film package members 140, the outermost peripheries except for one side are bonded by thermal fusion bonding or the like to obtain a pouched state, and the wound body is contained in the pouch-like package member 140. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 140. After that, the opening of the package member 140 is hermetically sealed by thermal fusion bonding or the like. Finally, the monomer is thermally polymerized to obtain a polymer compound. Thereby, the gel electrolyte layer 136 is formed. Accordingly, the secondary battery is completed.

In the third manufacturing method, firstly, the wound body is formed and contained in the pouch-like package member 140 in the same manner as that of the foregoing second manufacturing method, except that the separator 135 with both faces coated with a polymer compound is used. Examples of polymer compounds with which the separator 135 is coated include a polymer containing vinylidene fluoride as a component (a homopolymer, a copolymer, a multicomponent copolymer or the like). Specific examples include polyvinylidene fluoride, a binary copolymer containing vinylidene fluoride and hexafluoro propylene as a component, and a ternary copolymer containing vinylidene fluoride, hexafluoro propylene, and chlorotrifluoroethylene as a component. As a polymer compound, in addition to the foregoing polymer containing vinylidene fluoride as a component, another one or more polymer compounds may be contained. Subsequently, an electrolytic solution is prepared and injected into the package member 140. After that, the opening of the package member 140 is sealed by thermal fusion bonding or the like. Finally, the resultant is heated while a weight is applied to the package member 140, and the separator 135 is contacted with the cathode 133 and the anode 134 with the polymer compound in between. Thereby, the electrolytic solution is impregnated into the polymer compound, and the polymer compound is gelated to form the electrolyte layer 136. Accordingly, the secondary battery is completed.

In the third manufacturing method, the swollenness of the secondary battery is inhibited compared to the first manufacturing method. Further, in the third manufacturing method, the monomer, the solvent and the like as a raw material of the polymer compound are hardly left in the electrolyte layer 136 compared to the second manufacturing method. Thus, the formation step of the polymer compound is favorably controlled. Therefore, sufficient contact characteristics are obtained between the cathode 133/the anode 134/the separator 135 and the electrolyte layer 136.

In the secondary battery, at the time of charge, for example, lithium ions are extracted from the cathode 133, and are inserted in the anode 134 through the electrolyte layer 136. Meanwhile, at the time of discharge, for example, lithium ions are extracted from the anode 134, and are inserted in the cathode 133 through the electrolyte layer 136.

According to the second secondary battery, the anode 134 has the structure similar to that of the anode 10 illustrated in FIG. 1. Thus, the cycle characteristics are able to be improved while a high capacity is obtained. Other effect of the second secondary battery is similar to that of the foregoing anode 10.

3-3. Third Secondary Battery (Square Type)

Figure 9:
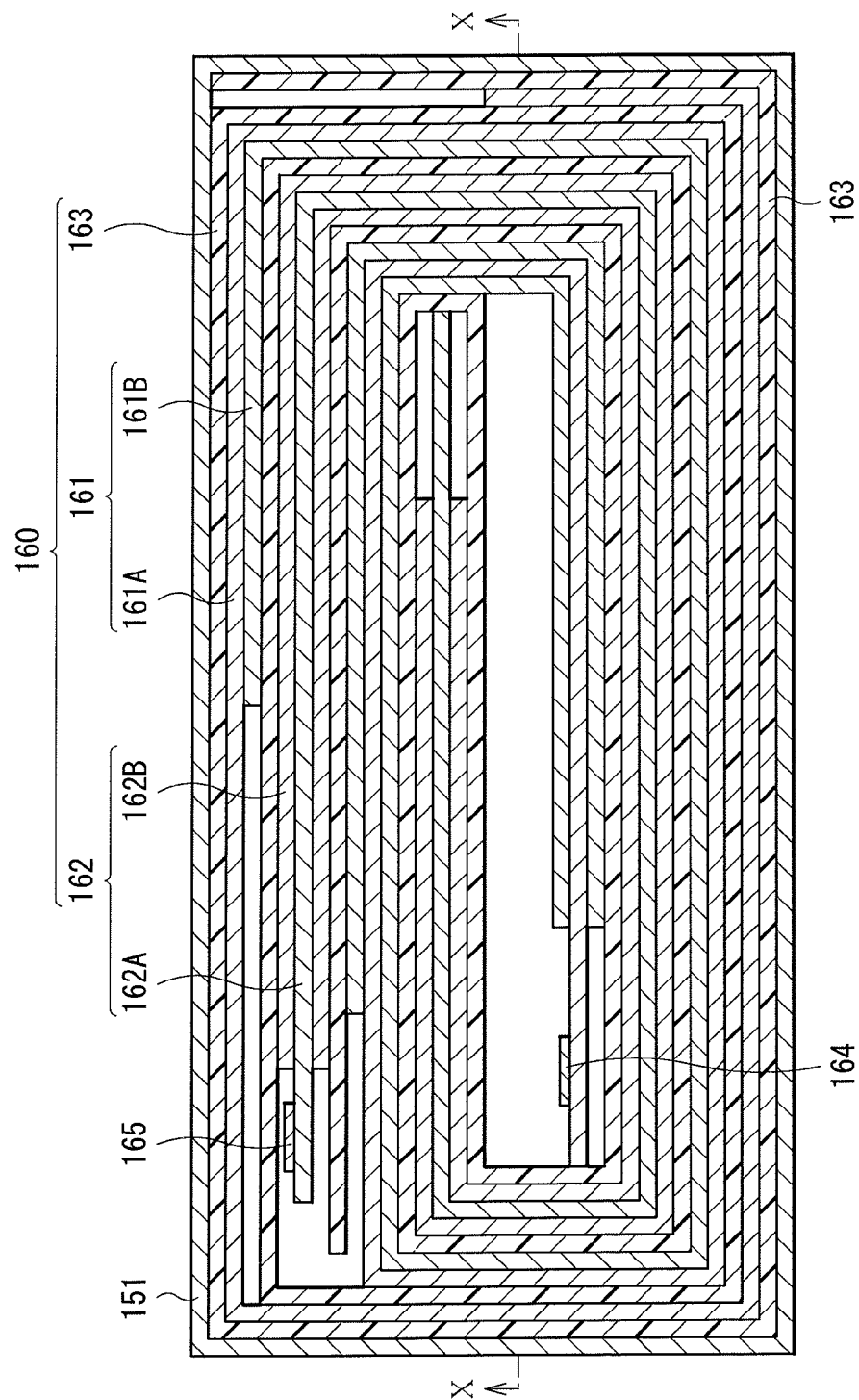
FIG. 9 is a cross sectional view illustrating a structure of a third secondary battery using the anode for a lithium ion secondary battery.
Figure 10:
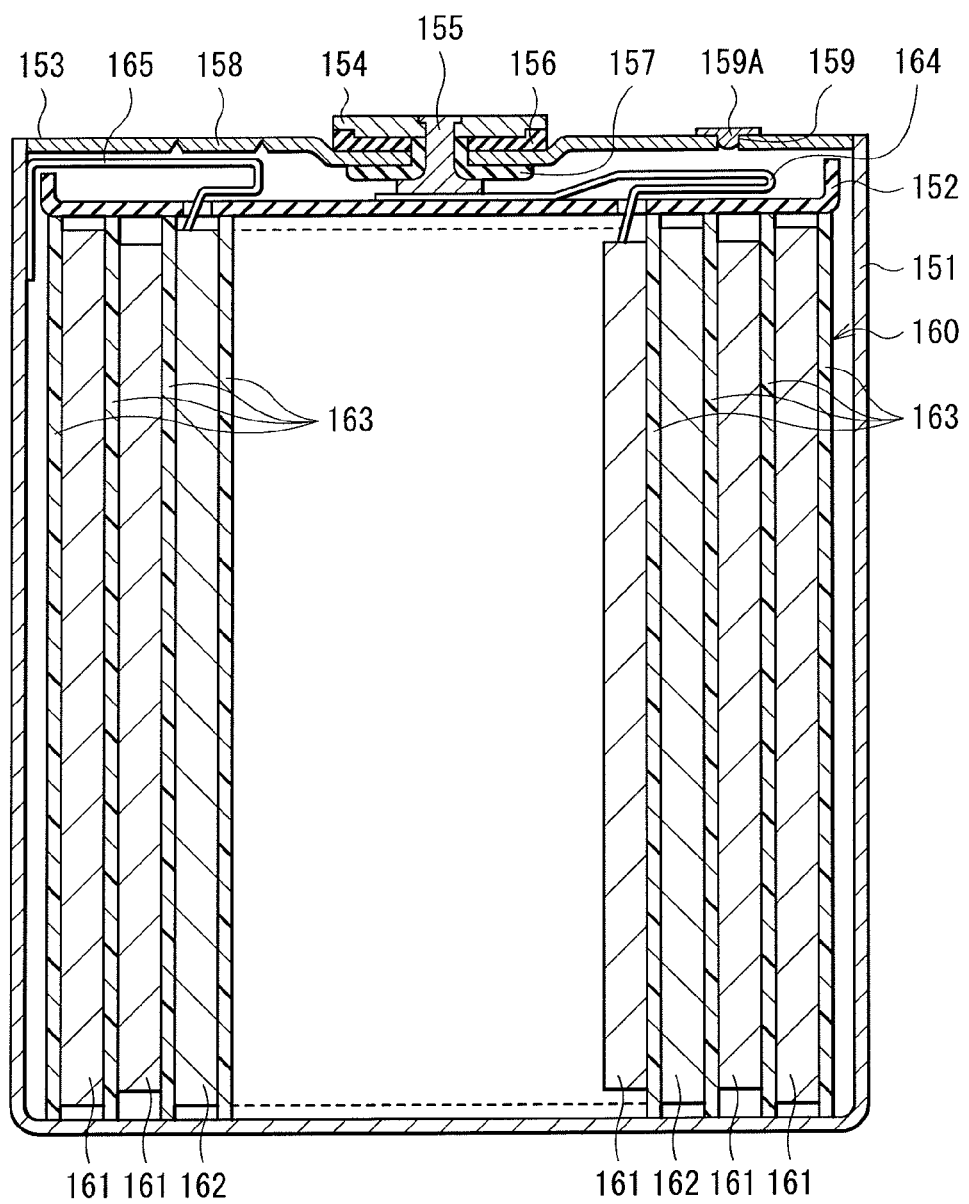
FIG. 10 is a cross sectional view illustrating a structure taken along line X-X of the wound electrode body illustrated in FIG. 9.

FIG. 9 and FIG. 10 illustrate a cross sectional structure of a third secondary battery. The cross section illustrated in FIG. 9 and the cross section illustrated in FIG. 10 are perpendicular to each other as the positional relation. In other words, FIG. 10 is a cross sectional view taken along line X-X illustrated in FIG. 9. The secondary battery is a so-called square type battery and is a lithium ion secondary battery in which a planular wound electrode body 160 is contained in a package can 151 in the shape of an approximate hollow rectangular solid.

The package can 151 is made of, for example, iron (Fe) plated by nickel (Ni). The package can 151 also has a function as an anode terminal. One end of the package can 151 is closed and the other end of the package can 151 is opened. At the open end of the package can 151, an insulating plate 152 and a battery cover 153 are attached, and thereby inside of the package can 151 is hermetically closed. The insulating plate 152 is made of polypropylene or the like, and is arranged perpendicular to the spirally wound circumferential face on the wound electrode body 160. The battery cover 153 is, for example, made of a material similar to that of the package can 151, and also has a function as an anode terminal together with the package can 151. Outside of the battery cover 153, a terminal plate 154 as a cathode terminal is arranged. In the approximate center of the battery cover 153, a through-hole is provided. A cathode pin 155 electrically connected to the terminal plate 154 is inserted in the through-hole. The terminal plate 154 is electrically insulated from the battery cover 153 with an insulating case 156 in between. The cathode pin 155 is electrically insulated from the battery cover 153 with a gasket 157 in between. The insulating case 156 is made of polybutylene terephthalate or the like. The gasket 157 is made of, for example, an insulating material, and the surface thereof is coated with asphalt.

In the vicinity of the rim of the battery cover 153, a cleavage valve 158 and an electrolytic solution injection hole 159 are provided. The cleavage valve 158 is electrically connected to the battery cover 153. When the internal pressure of the battery becomes a certain level or more by internal short circuit, external heating or the like, the cleavage valve 158 is cleaved to suppress internal pressure rise. The electrolytic solution injection hole 159 is sealed by a sealing member 159A made of, for example, a stainless steel ball.

In the wound electrode body 160, a cathode 161 and an anode 162 are layered with a separator 163 in between, and are spirally wound. The wound electrode body 160 is shaped planular according to the shape of the package can 151. The separator 163 is located at the outermost circumference of the wound electrode body 160, and the cathode 161 is located just inside thereof. FIG. 10 is a simplified view of the laminated structure of the cathode 161 and the anode 162. The winding number of the wound electrode body 160 is not limited to the number illustrated in FIG. 9 and FIG. 10, but is able to be voluntarily set. A cathode lead 164 made of aluminum (Al) or the like is connected to the cathode 161 of the wound electrode body 160. An anode lead 165 made of nickel or the like is connected to the anode 162. The cathode lead 164 is electrically connected to the terminal plate 154 by being welded to the lower end of the cathode pin 155. The anode lead 165 is welded and electrically connected to the package can 151.

As illustrated in FIG. 9, in the cathode 161, a cathode active material layer 161B is provided on a single face or both faces of a cathode current collector 161A. In the anode 162, an anode active material layer 162B is provided on a single face or both faces of an anode current collector 162A. Structures of the cathode current collector 161A, the cathode active material layer 161B, the anode current collector 162A, the anode active material layer 162B, and the separator 163 are respectively similar to the structures of the cathode current collector 121A, the cathode active material layer 121B, the anode current collector 122A, the anode active material layer 122B, and the separator 123 in the first secondary battery described above. An electrolytic solution similar to that of the separator 123 is impregnated in the separator 163.

The third secondary battery is able to be manufactured, for example, as follows.

As in the foregoing first secondary battery, the cathode 161 and the anode 162 are layered with the separator 163 in between and spirally wound, and therefore the wound electrode body 160 is formed. After that, the wound electrode body 160 is contained in the package can 151. Next, the insulating plate 152 is arranged on the wound electrode body 160. The anode lead 165 is welded to the package can 151, the cathode lead 164 is welded to the lower end of the cathode pin 155, and the battery cover 153 is fixed on the open end of the package can 151 by laser welding. Finally, the electrolytic solution is injected into the package can 151 through the electrolytic solution injection hole 159, and impregnated in the separator 163. After that, the electrolytic solution injection hole 159 is sealed by the sealing member 159A. The secondary battery illustrated in FIG. 9 and FIG. 10 is thereby completed.

According to the third secondary battery, the anode 162 has the structure similar to that of the anode 10 illustrated in FIG. 1 described above. Thus, the cycle characteristics are able to be improved while a high capacity is obtained. Other effect of the third secondary battery is similar to that of the foregoing anode 10.

4. Application of a Lithium Ion Secondary Battery

Next, a description will be given of an application example of the foregoing lithium ion secondary battery.

Applications of the lithium ion secondary battery is not particularly limited as long as the lithium ion secondary battery is applied to a machine, a device, an instrument, an equipment, a system (collective entity of a plurality of devices and the like) or the like that is able to use the lithium ion secondary battery as a drive power source, an electric power storage source for electric power storage or the like. In the case where the lithium ion secondary battery is used as a power source, the lithium ion secondary battery may be used as a main power source (power source used preferentially), or an auxiliary power source (power source used instead of a main power source or used being switched from the main power source). In the latter case, the main power source type is not limited to the lithium ion secondary battery.

Examples of applications of the lithium ion secondary battery include portable electronic devices such as a video camera, a digital still camera, a mobile phone, a notebook personal computer, a codeless phone, a headphone stereo, a portable radio, a portable television, and a Personal Digital Assistant (PDA); a portable daily instrument such as an electric shaver; a storage equipment such as a backup power source and a memory card; an electric power tool such as an electric drill and an electric saw; a medical electronic device such as a pace maker and an acoustic aid; a vehicle such as an electrical vehicle (including a hybrid car); and an electric power storage system such as a home battery system for storing electric power for emergency or the like. It is needless to say that application other than the foregoing applications may be adopted.

Specially, the lithium ion secondary battery is effectively applied to the electric power tool, the electrical vehicle, the electric power storage system or the like. In these applications, since superior battery characteristics (cycle characteristics, storage characteristics, and load characteristics and the like) are demanded, the characteristics are able to be effectively improved by using the lithium ion secondary battery. The electric power tool is a tool in which a moving part (for example, a drill or the like) is operated by using the lithium ion secondary battery as a driving power source. The electrical vehicle is a car that acts (runs) by using the lithium ion secondary battery as a driving power source. As described above, a car including the drive source as well other than the lithium ion secondary battery (hybrid car or the like) may be adopted. The electric power storage system is a system using the lithium ion secondary battery as an electric power storage source. For example, in a home electric power storage system, electric power is stored in the lithium ion secondary battery as an electric power storage source, and the electric power is consumed according to needs. In result, various devices such as home electric products become usable.

EXAMPLES

Specific examples of the embodiments will be described in detail.

Example 1-1

The square secondary battery illustrated in FIG. 9 and FIG. 10 was manufactured by the following procedure. The secondary battery was formed as a lithium ion secondary battery in which the capacity of the anode 162 was expressed based on insertion and extraction of lithium.

First, the cathode 161 was formed. Lithium carbonate ($Li_2CO_3$) and cobalt carbonate ($CoCO_3$) were mixed at a molar ratio of 0.5:1. After that, the mixture was fired in the air at 900 degrees Celsius for 5 hours. Thereby, lithium cobalt composite oxide ($LiCoO_2$) was obtained. Subsequently, 96 parts by mass of the lithium cobalt composite oxide as a cathode active material, 1 part by mass of graphite as an electrical conductor, and 3 parts by mass of polyvinylidene fluoride as a binder were mixed to obtain a cathode mixture. After that, the cathode mixture was dispersed in N-methyl-2-pyrrolidone to obtain paste cathode mixture slurry. Finally, both faces of the cathode current collector 161A made of a strip-shaped aluminum foil (thickness: 15 μm) were uniformly coated with the cathode mixture slurry, which was then dried. After that, the resultant was compression-molded by a roll pressing machine to form the cathode active material layer 161B. After that, the cathode lead 164 made of aluminum was welded and attached to an end of the cathode current collector 161A.

Next, the anode 162 was formed. Specifically, first, the anode current collector 162A (thickness: 20 μm, ten point height of roughness profile Rz: 4.0 μm) made of an electrolytic copper foil was prepared. After that, an anode active material was deposited several times on both faces of the anode current collector 162A by electron beam evaporation method, and the first layer 1 and the second layer 2 were alternately layered. Thereby, the anode active material layer 162B having a total thickness of 8 μm was obtained. In this case, an evaporation source composed of monocrystal silicon and an evaporation source composed of nickel as the metal element X were used, the evaporation rate of each evaporation source was changed, and therefore the first layer 1 and the second layer 2 having a given composition were alternately layered. More specifically, as illustrated in Table 1, the foregoing evaporation rate was adjusted so that the silicon content ratio A in the first layer 1 was 90 atomic % and the silicon content ratio B in the second layer 2 was 89 atomic %. Further, by adjusting the evaporation treatment time, the thickness C of the first layer 1 and the thickness D of the second layer 2 were 0.4 μm and 0.2 μm. After the anode active material layer 162B was formed, the anode lead 165 made of nickel was welded and attached to one end of the anode current collector 162A.

Figure 11:
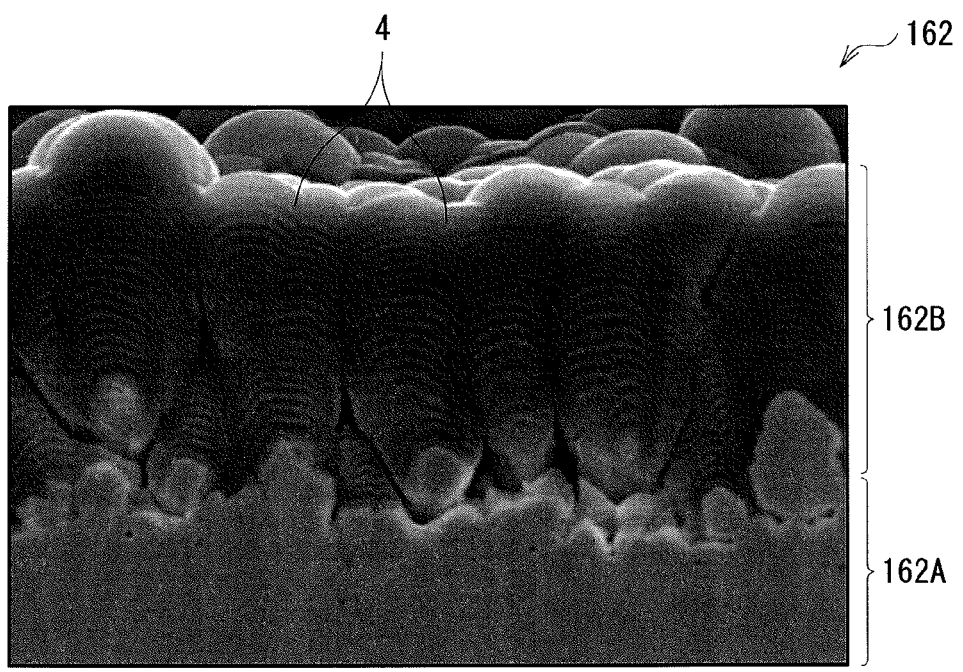
FIG. 11 is an image of an electronic microscope illustrating a cross section of an anode for a lithium ion secondary battery of an example.

A cross section of the anode 162 obtained as above was enlarged and observed. In result, for example, as illustrated in FIG. 11, the plurality of anode active material particles 4 extending in the direction perpendicular to the surface of the anode current collector 162A from the projection section of the surface of the anode current collector 162A as a base point were confirmed. Further, it was confirmed that the anode active material particles 4 had a structure in which the first layer 1 and the second layer 2 with each silicon content ratio different from each other were alternately layered. FIG. 11 is an image (SEM image) obtained by observing a cross section of the anode 162 obtained by polishing with the use of a cross section polisher by using a Scanning Electron Microscope (SEM). Based on the SEM image, the thickness C and the thickness D were measured. In result, it was confirmed that the averages of the thickness C and the thickness D were 0.4 μm and 0.2 μm, respectively. Further, each composition (silicon content ratio) in the first layer 1 and the second layer 2 was measured by miniregion element analysis with the use of an Energy Dispersive X-ray spectrometer (EDX). In result, it was confirmed that the silicon content ratio A was 90 atomic % and the silicon content ratio B was 89 atomic %. However, FIG. 11 illustrates an example of the anode formed by using electron beam evaporation method. Specifically, FIG. 11 illustrates an SEM image of the anode of Example 1-4 (described later).

Subsequently, the separator 163 made of a microporous polyethylene film with a thickness of 23 μm was prepared. The cathode 161, the separator 163, the anode 162, and the separator 163 were layered sequentially to form a laminated body. The resultant laminated body was spirally wound several times, and therefore the wound electrode body 160 was formed. The obtained wound electrode body 160 was shaped into a planular shape.

Next, the planular-shaped wound electrode body 160 was contained in the package can 151. After that, the insulating plate 152 was arranged on the wound electrode body 160. The anode lead 165 was welded to the package can 151, the cathode lead 144 was welded to the lower end of the cathode pin 155, and the battery cover 153 was fixed on the open end section of the package can 151 by laser welding. After that, an electrolytic solution was injected into the package can 151 through the electrolytic solution injection hole 159. The electrolytic solution used was obtained by dissolving $LiPF_6$ as an electrolyte salt at a concentration of 1 mol/kg into a mixed solvent of 50 wt % of ethylene carbonate (EC) and 50 wt % of diethyl carbonate (DEC). Finally, the electrolytic solution injection hole 159 was sealed by the sealing member 159A, and therefore a square type secondary battery was obtained. The battery capacity was 800 mAh. Further, design was made so that the capacity usage ratio of the anode active material (anode usage ratio) was 50%. In this case, the anode usage ratio means a numerical value expressed by A/B×100(%) where the lithium insertion amount per unit area of the anode 162 in a state of full charge is A and the lithium insertion amount capable of being electrochemically inserted per unit area of the anode 162 is B.

Examples 1-2 to 1-8

Secondary batteries of Examples 1-2 to 1-8 were fabricated in the same manner as that of Example 1-1, except that the respective silicon content ratios B were changed as illustrated in Table 1 in forming the anode active material layer 162B.

Examples 1-9 and 1-10

Secondary batteries of Examples 1-9 and 1-10 were fabricated in the same manner as that of Example 1-1, except that the composition of the anode active material was uniform (that is, the silicon content ratio A was equal to the silicon content ratio B) in forming the anode active material layer 162B. In Example 1-9, only silicon was contained as an anode active material. In Example 1-10, silicon and nickel were contained as an anode active material, and the silicon content ratios A and B were 90 atomic %.

For the secondary batteries of Examples 1-1 to 1-10 fabricated as above, the cycle characteristics were examined. The results are illustrated in Table 1. Further, for the secondary batteries of Examples 1-2 to 1-10, the silicon content ratios A and B and the thicknesses C and D were measured and checked in the same manner as that of Example 1-1. The results thereof are also illustrated in Table 1. Although for the secondary batteries of other examples described below, the silicon content ratios A and B and the thicknesses C and D were measured and checked in the same manner, the description thereof will be omitted.

In examining the cycle characteristics, a cycle test was performed by the following procedure and therefore the discharge capacity retention ratio was obtained. First, to stabilize the battery state, after charge and discharge were performed 1 cycle in the atmosphere at 25 degrees Celsius, charge and discharge were performed again to measure the discharge capacity at the second cycle. Subsequently, charge and discharge were performed 98 cycles in the same atmosphere to measure the discharge capacity at the 100th cycle. Finally, the discharge capacity retention ratio (%)=(discharge capacity at the 100th cycle/discharge capacity at the second cycle)×100 was calculated. At this time, for the first cycle, first, constant current charge was performed at the constant current density of 0.3 mA/cm² until the battery voltage reached 4.25 V, constant voltage charge was continuously performed at the constant voltage of 4.25 V until the current density reached 0.1 mA/cm², and constant current discharge was performed at the constant current density of 0.1 mA/cm² until the battery voltage reached 2.7 V. For each one cycle on and after the second cycle, first, constant current charge was performed at the constant current density of 3 mA/cm² until the battery voltage reached 4.2 V, constant voltage charge was continuously performed at the constant voltage of 4.2 V until the current density reached 0.1 mA/cm², and constant current discharge was performed at the constant current density of 3 mA/cm² until the battery voltage reached 2.7 V.

TABLE 1

| | Metal element | Silicon content (%) A | B | A/B | Thickness (μm) C | D | C/D | Discharge capacity retention ratio (%) |
|---|---|---|---|---|---|---|---|---|
| Example 1-1 | Ni | 90 | 89 | 1.01 | 0.4 | 0.2 | 2 | 68 |
| Example 1-2 | Ni | 90 | 88 | 1.02 | 0.4 | 0.2 | 2 | 74 |
| Example 1-3 | Ni | 90 | 80 | 1.13 | 0.4 | 0.2 | 2 | 84 |
| Example 1-4 | Ni | 90 | 50 | 1.8 | 0.4 | 0.2 | 2 | 83 |
| Example 1-5 | Ni | 90 | 20 | 4.5 | 0.4 | 0.2 | 2 | 80 |
| Example 1-6 | Ni | 90 | 10 | 9 | 0.4 | 0.2 | 2 | 76 |
| Example 1-7 | Ni | 90 | 1.8 | 50 | 0.4 | 0.2 | 2 | 70 |
| Example 1-8 | Ni | 90 | 1 | 90 | 0.4 | 0.2 | 2 | 68 |
| Example 1-9 | Ni | 100 | 100 | 1 | 0.4 | 0.2 | 2 | 59 |
| Example 1-10 | Ni | 90 | 90 | 1 | 0.4 | 0.2 | 2 | 68 |

In Examples 1-1 to 1-8 and 1-10 in which nickel was added, the discharge capacity retention ratio was improved more than in Example 1-9 in which only silicon was contained as an anode active material. In particular, in the case where the composition ratio A/B satisfied conditional expression 1 (Examples 1-2 to 1-7), the discharge capacity retention ratio was largely improved more than in other cases (Example 1-1 and 1-8 to 1-10) possibly for the following reason. That is, first, in the case where the composition ratio A/B was excessively small, stress relaxation effect was small and thus contribution to the discharge capacity retention ratio was not clearly shown. Meanwhile, in the case where the composition ratio A/B was excessively large, expansion/shrinkage ratio difference at the time of charge and discharge between the first layer and the second layer was excessively large, stress was generated in the interface thereof, resulting in prevention of improvement of the discharge capacity retention ratio.

Examples 2-1 to 2-9

Next, secondary batteries of Examples 2-1 to 2-9 were fabricated in the same manner as that of Example 1-1, except that the silicon content ratio A in the first layer 1 was fixed to 70 atomic % and the silicon content ratio B in the second layer 2 was changed as illustrated in Table 2, respectively. For Examples 2-1 to 2-9, the cycle characteristics (discharge capacity retention ratio) were examined. The results illustrated in Table 2 were obtained.

TABLE 2

| | Metal element | Silicon content (%) A | B | A/B | Thickness (μm) C | D | C/D | Discharge capacity retention ratio (%) |
|---|---|---|---|---|---|---|---|---|
| Example 2-1 | Ni | 70 | 69 | 1.01 | 0.4 | 0.2 | 2 | 66 |
| Example 2-2 | Ni | 70 | 68 | 1.03 | 0.4 | 0.2 | 2 | 70 |
| Example 2-3 | Ni | 70 | 62 | 1.13 | 0.4 | 0.2 | 2 | 78 |
| Example 2-4 | Ni | 70 | 40 | 1.75 | 0.4 | 0.2 | 2 | 81 |
| Example 2-5 | Ni | 70 | 16 | 4.4 | 0.4 | 0.2 | 2 | 81 |
| Example 2-6 | Ni | 70 | 8 | 8.8 | 0.4 | 0.2 | 2 | 78 |
| Example 2-7 | Ni | 70 | 1.4 | 50.0 | 0.4 | 0.2 | 2 | 71 |
| Example 2-8 | Ni | 70 | 1 | 70.0 | 0.4 | 0.2 | 2 | 67 |
| Example 1-9 | Ni | 100 | 100 | 1 | 0.4 | 0.2 | 2 | 59 |
| Example 2-9 | Ni | 70 | 70 | 1 | 0.4 | 0.2 | 2 | 65 |

It was confirmed that as illustrated in Table 2, in the case where the silicon content ratio A was 70 atomic %, if the conditional expression 1 that specifies relation with the silicon content ratio B was satisfied, the discharge capacity retention ratio was largely improved as well.

Examples 3-1 to 3-10

Secondary batteries of Examples 3-1 to 3-10 were fabricated in the same manner as that of Example 1-3, except that the thickness C was changed as illustrated in Table 3, the thickness D was 0.4 μm, and two first layers and two second layers were alternately layered in forming the anode active material layer 162B. For Examples 3-1 to 3-10, the cycle characteristics (discharge capacity retention ratio) were examined. The results illustrated in Table 3 were obtained.

TABLE 3

| | Metal element | Silicon content (%) A | B | A/B | Thickness (μm) C | D | C/D | Discharge capacity retention ratio (%) |
|---|---|---|---|---|---|---|---|---|
| Example 3-1 | Ni | 90 | 80 | 1.13 | 0.03 | 0.4 | 0.075 | 68 |
| Example 3-2 | Ni | 90 | 80 | 1.13 | 0.04 | 0.4 | 0.1 | 72 |
| Example 3-3 | Ni | 90 | 80 | 1.13 | 0.08 | 0.4 | 0.2 | 77 |
| Example 3-4 | Ni | 90 | 80 | 1.13 | 0.2 | 0.4 | 0.5 | 82 |
| Example 3-5 | Ni | 90 | 80 | 1.13 | 0.4 | 0.4 | 1.0 | 83 |
| Example 3-6 | Ni | 90 | 80 | 1.13 | 1.0 | 0.4 | 2.5 | 81 |
| Example 3-7 | Ni | 90 | 80 | 1.13 | 2.0 | 0.4 | 5.0 | 77 |
| Example 3-8 | Ni | 90 | 80 | 1.13 | 8.0 | 0.4 | 20 | 74 |
| Example 3-9 | Ni | 90 | 80 | 1.13 | 16.0 | 0.4 | 40 | 71 |
| Example 3-10 | Ni | 90 | 80 | 1.13 | 20.0 | 0.4 | 50 | 68 |

It was confirmed that as illustrated in Table 3, in the case where the composition ratio C/D satisfied conditional expression 2 (Examples 3-2 to 3-9), the discharge capacity retention ratio was largely improved more than in the other cases (Examples 3-1 and 3-10).

Examples 4-1 to 4-10

Secondary batteries of Examples 4-1 to 4-10 were fabricated in the same manner as that of Example 3-1, except that the thickness C was 0.4 μm, and the thickness D was changed as illustrated in Table 4. For Examples 4-1 to 4-10, the cycle characteristics (discharge capacity retention ratio) were examined. The results illustrated in Table 4 were obtained.

TABLE 4

| | Metal element | Silicon content (%) A | B | A/B | Thickness (μm) C | D | C/D | Discharge capacity retention ratio (%) |
|---|---|---|---|---|---|---|---|---|
| Example 4-1 | Ni | 90 | 80 | 1.13 | 0.4 | 0.008 | 50 | 68 |
| Example 4-2 | Ni | 90 | 80 | 1.13 | 0.4 | 0.01 | 40 | 70 |
| Example 4-3 | Ni | 90 | 80 | 1.13 | 0.4 | 0.02 | 20 | 75 |
| Example 4-4 | Ni | 90 | 80 | 1.13 | 0.4 | 0.05 | 8.0 | 78 |
| Example 4-5 | Ni | 90 | 80 | 1.13 | 0.4 | 0.1 | 4.0 | 80 |
| Example 4-6 | Ni | 90 | 80 | 1.13 | 0.4 | 0.2 | 2.0 | 84 |
| Example 3-5 | Ni | 90 | 80 | 1.13 | 0.4 | 0.4 | 1.0 | 83 |
| Example 4-7 | Ni | 90 | 80 | 1.13 | 0.4 | 1 | 0.4 | 79 |
| Example 4-8 | Ni | 90 | 80 | 1.13 | 0.4 | 2 | 0.2 | 76 |
| Example 4-9 | Ni | 90 | 80 | 1.13 | 0.4 | 4 | 0.1 | 71 |
| Example 4-10 | Ni | 90 | 80 | 1.13 | 0.4 | 5 | 0.08 | 68 |

It was confirmed that as illustrated in Table 4, in the case where the composition ratio C/D satisfied conditional expression 2 (Examples 4-2 to 4-9), the discharge capacity retention ratio was largely improved more than in the other cases (Examples 4-1 and 4-10).

Examples 5-1 to 5-7

Next, secondary batteries of Examples 5-1 to 5-7 were fabricated in the same manner as that of Example 1-3, except that the metal element X as an anode active material was changed as illustrated in Table 5.

Examples 5-8 to 5-14

Secondary batteries of Examples 5-8 to 5-14 were fabricated in the same manner as that of Examples 5-1 to 5-7, except that the composition of the anode active material was uniform (that is, the silicon content ratio A was equal to the silicon content ratio B) in forming the anode active material layer 162B. In Examples 5-8 to 5-14, the silicon content ratios A and B were 90 atomic %.

For Examples 5-1 to 5-14, the cycle characteristics (discharge capacity retention ratio) were examined. The results illustrated in Table 5 were obtained.

TABLE 5

| | Metal element | Silicon content (%) A | B | A/B | Thickness (μm) C | D | C/D | Discharge capacity retention ratio (%) |
|---|---|---|---|---|---|---|---|---|
| Example 5-1 | Fe | 90 | 80 | 1.13 | 0.4 | 0.02 | 2 | 84 |
| Example 5-2 | Co | 90 | 80 | 1.13 | 0.4 | 0.02 | 2 | 83 |
| Example 5-3 | Mn | 90 | 80 | 1.13 | 0.4 | 0.02 | 2 | 82 |
| Example 5-4 | Cr | 90 | 80 | 1.13 | 0.4 | 0.02 | 2 | 82 |
| Example 5-5 | Al | 90 | 80 | 1.13 | 0.4 | 0.02 | 2 | 82 |
| Example 5-6 | Mg | 90 | 80 | 1.13 | 0.4 | 0.02 | 2 | 83 |
| Example 5-7 | Mo | 90 | 80 | 1.13 | 0.4 | 0.02 | 2 | 82 |
| Example 5-8 | Fe | 90 | 90 | 1 | — | — | — | 68 |
| Example 5-9 | Co | 90 | 90 | 1 | — | — | — | 68 |
| Example 5-10 | Mn | 90 | 90 | 1 | — | — | — | 67 |
| Example 5-11 | Cr | 90 | 90 | 1 | — | — | — | 67 |
| Example 5-12 | Al | 90 | 90 | 1 | — | — | — | 68 |
| Example 5-13 | Mg | 90 | 90 | 1 | — | — | — | 67 |
| Example 5-14 | Mo | 90 | 90 | 1 | — | — | — | 67 |

It was confirmed that as illustrated in Table 5, in the case where the composition ratio A/B satisfied conditional expression 1 (Examples 5-1 to 5-7), the discharge capacity retention ratio was largely improved more than in the other cases (Examples 5-8 to 5-14). In other words, it was confirmed that in the case where cobalt, iron, manganese, chromium, titanium, aluminum, magnesium, or molybdenum was used instead of nickel as the metal element X, tendency similar to that in the case of using nickel was also shown. Although single type of the metal element X was added in these examples, it was confirmed that similar effect was obtained as well in the case where the anode active material was formed by using a plurality of metal elements X together with silicon.

Examples 6-1 to 6-4

Secondary batteries of Examples 6-1 to 6-4 were fabricated in the same manner as that of Example 1-3, except that the surface roughness (Rz value) of the anode current collector 162A was changed in the range from 1.0 μm to 7.5 μm as illustrated in Table 6.

For the secondary batteries of Examples 6-1 to 6-4, the cycle characteristics were examined. The results illustrated in Table 6 were obtained. In Table 6, the result of Example 1-3 was also illustrated.

TABLE 6

|  | Surface roughness Rz (μm) | Metal element | Silicon content (%) A | B | A/B | Thickness (μm) C | D | C/D | Discharge capacity retention ratio (%) |
|---|---|---|---|---|---|---|---|---|---|
| Example 6-1 | 1.0 | Ni | 90 | 80 | 1.13 | 0.4 | 0.2 | 2 | 67 |
| Example 6-2 | 1.5 | Ni | 90 | 80 | 1.13 | 0.4 | 0.2 | 2 | 82 |
| Example 1-3 | 4.0 | Ni | 90 | 80 | 1.13 | 0.4 | 0.2 | 2 | 84 |
| Example 6-3 | 6.5 | Ni | 90 | 80 | 1.13 | 0.4 | 0.2 | 2 | 80 |
| Example 6-4 | 7.5 | Ni | 90 | 80 | 1.13 | 0.4 | 0.2 | 2 | 68 |

It was found that as illustrated in Table 6, in the case where the surface roughness (Rz value) of the anode current collector 72A was from 1.5 μm to 6.5 μm both inclusive, higher discharge capacity retention ratio was obtained.

Examples 7-1 to 7-4

Secondary batteries of Examples 7-1 to 7-4 were fabricated in the same manner as that of Example 1-3, except that the anode usage ratio was changed in the range from 10% to 90% as illustrated in Table 7. The anode usage ratio was adjusted by changing the coating amount per unit area of the cathode active material layer 161B.

For the secondary batteries of Examples 7-1 to 7-4, the cycle characteristics were examined. The results illustrated in Table 7 were obtained. In Table 7, the result of Example 1-3 was also illustrated.

TABLE 7

|  | Anode usage ratio (%) | Metal element | Silicon content (%) A | B | A/B | Thickness (μm) C | D | C/D | Discharge capacity retention ratio (%) |
|---|---|---|---|---|---|---|---|---|---|
| Example 7-1 | 10 | Ni | 90 | 80 | 1.13 | 0.4 | 0.2 | 2 | 68 |
| Example 7-2 | 20 | Ni | 90 | 80 | 1.13 | 0.4 | 0.2 | 2 | 82 |
| Example 1-3 | 50 | Ni | 90 | 80 | 1.13 | 0.4 | 0.2 | 2 | 84 |
| Example 7-3 | 80 | Ni | 90 | 80 | 1.13 | 0.4 | 0.2 | 2 | 80 |
| Example 7-4 | 90 | Ni | 90 | 80 | 1.13 | 0.4 | 0.2 | 2 | 67 |

It was found that as illustrated in Table 7, in the case where the anode usage ratio was from 20% to 80% both inclusive, higher discharge capacity retention ratio was obtained.

Examples 8-1 to 8-4

Secondary batteries of Examples 8-1 to 8-4 were fabricated in the same manner as that of Example 1-3, except that part or all of $LiCoO_2$ as a cathode active material was substituted with $LiNiO_2$.

TABLE 8

|  | Composition of cathode active material $LiCoO_2$ | $LiNiO_2$ | Metal element | Silicon content (%) A | B | A/B | Thickness (μm) C | D | C/D | Discharge capacity retention ratio (%) |
|---|---|---|---|---|---|---|---|---|---|---|
| Example 1-3 | 100% | 0% | Ni | 90 | 80 | 1.13 | 0.4 | 0.2 | 2 | 84 |
| Example 8-1 | 75% | 25% | Ni | 90 | 80 | 1.13 | 0.4 | 0.2 | 2 | 85 |
| Example 8-2 | 50% | 50% | Ni | 90 | 80 | 1.13 | 0.4 | 0.2 | 2 | 89 |
| Example 8-3 | 25% | 75% | Ni | 90 | 80 | 1.13 | 0.4 | 0.2 | 2 | 91 |
| Example 8-4 | 0% | 100% | Ni | 90 | 80 | 1.13 | 0.4 | 0.2 | 2 | 92 |

It was found that as illustrated in Table 8, in the case where the content ratio of $LiNiO_2$ in the cathode active material was increased, higher discharge capacity retention ratio was obtained. In other words, it is presumed that a cathode active material containing a large amount of nickel than that of cobalt is preferably used in order to obtain more favorable cycle characteristics.

Example 9-1

A secondary battery of Example 9-1 was fabricated in the same manner as that of Example 1-3, except that 4-fluoro-1,3-dioxolane-2-one (FEC) was used in addition to EC and DEC as a solvent, and the solvent composition (EC:DEC:FEC) was changed to 40:50:10 at a weight ratio.

Example 9-2

A secondary battery of Example 9-2 was fabricated in the same manner as that of Example 1-3, except that 4,5-difluoro-1,3-dioxolane-2-one (DFEC) was used in addition to EC and DEC as a solvent, and the solvent composition (EC:DEC:DFEC) was changed to 40:50:10 at a weight ratio.

Examples 9-3 and 9-4

Secondary batteries were fabricated in the same manner as that of Example 1-3, except that as an additive, sulfobenzoic anhydride (SBAH: Example 9-3) or sulfopropionic anhydride (SPAH: Example 9-4) as an acid anhydride was added to an electrolytic solution. At this time, the contents of SBAH and SPAH in the electrolytic solution were 1 wt %. "1 wt %" means that where a whole solvent was 100 wt %, a portion corresponding to 1 wt % of SBAH or SPAH was added.

Example 9-5

A secondary battery of Example 9-5 was fabricated in the same manner as that of Example 1-3, except that as a solvent, 1,3-propene sultone (PRS) as sultone was added to the electrolytic solution. At this time, the concentration of PRS in the electrolytic solution was 1 wt %. "1 wt %" means that where a whole solvent excluding PRS was 100 wt %, a portion corresponding to 1 wt % of PRS was added.

Examples 9-6 and 9-7

Secondary batteries were fabricated in the same manner as that of Example 1-3, except that as an additive, vinylene carbonate (VC) or vinylethylene carbonate (VEC) was added to the electrolytic solution. At this time, the contents of VC and VEC in the electrolytic solution were 1 wt %. "1 wt %" means that where a whole solvent was 100 wt %, a portion corresponding to 1 wt % of VC or VEC was added.

Example 9-8

A secondary battery of Example 9-8 was fabricated in the same manner as that of Example 1-3, except that lithium tetrafluoroborate ($LiBF_4$) was further added as an electrolyte salt to the solvent at a ratio of 0.1 mol/kg.

For the secondary batteries of Examples 9-1 to 9-8, the cycle characteristics (discharge capacity retention ratio) were examined. The results illustrated in Table 9 were obtained.

TABLE 9

| | Electrolytic solution | | | | | | Discharge capacity retention ratio (%) |
|---|---|---|---|---|---|---|---|
| | Solvent (wt %) | | | | Electrolyte salt | Others | |
| | EC | DEC | FEC | DFEC | mol/kg | wt % | |
| Example 1-3 | 50 | 50 | — | — | $LiPF_6$: 1 | — | 84 |
| Example 9-1 | 40 | 50 | 10 | — | $LiPF_6$: 1 | — | 88 |
| Example 9-2 | 40 | 50 | — | 10 | $LiPF_6$: 1 | — | 93 |
| Example 9-3 | 50 | 50 | — | — | $LiPF_6$: 1 | SBAH: 1 | 91 |
| Example 9-4 | 50 | 50 | — | — | $LiPF_6$: 1 | SPAH: 1 | 89 |
| Example 9-5 | 50 | 50 | — | — | $LiPF_6$: 1 | PRS: 1 | 89 |
| Example 9-6 | 50 | 50 | — | — | $LiPF_6$: 1 | VC: 1 | 88 |
| Example 9-7 | 50 | 50 | — | — | $LiPF_6$: 1 | VEC: 1 | 89 |
| Example 9-8 | 50 | 50 | — | — | $LiPF_6$: 1 $LiBF_4$: 0.1 | — | 92 |

*PRS: 1,3-propene sultone
*SBAH: sulfobenzoic anhydride
*SPAH: sulfopropionic anhydride As illustrated in Table 9, it was found that in the case where FEC or DFEC was added as a solvent, the discharge capacity retention ratio was more improved. Further, in the case where as an additive, SBAH, SPAH, PRS, VC, and VEC were respectively added into the electrolytic solution (Examples 9-3 to 9-7), or $LiBF_4$ was further added as an electrolyte salt (Example 9-8), a slightly higher discharge capacity retention ratio was obtained compared to a case that SBAH, SPAH, PRS, VC, and VEC or $LiBF_4$ was not added (Example 1-3).

Example 10-1

The laminated film type secondary battery illustrated in FIG. 6 to FIG. 8 was fabricated instead of the square type secondary battery by the following procedure. At this time, the laminated film type secondary battery was fabricated as a lithium ion secondary battery in which the capacity of the anode 134 was expressed based on insertion and extraction of lithium.

First, the cathode 133 was formed. First, both faces of the cathode current collector 133A made of a strip-shaped aluminum foil (thickness: 15 μm) were uniformly coated with the cathode mixture slurry formed in the same manner as that of Example 1-3, which was then dried. After that, the resultant was compression-molded by a roll pressing machine to form the cathode active material layer 133B.

Next, the anode 134 was formed. First, an electrolytic copper foil (thickness: 20 μm, ten point height of roughness profile Rz: 4.0 μm) was prepared as the anode current collector 134A, which was laid inside of a chamber. Next, an evaporation source composed of monocrystal silicon and an evaporation source composed of nickel were used, the anode active material was deposited several times on both faces of the anode current collector 134A by using electron beam evaporation method, the first layer 1 and the second layer 2 were alternately layered, and thereby the anode active material layer 134B having a thickness of 8 μm was formed.

Next, the secondary battery was assembled by using the cathode 133, the anode 134, and the electrolytic solution similar to that of Example 1-3. The cathode lead 131 made of aluminum was welded to one end of the cathode current collector 133A, and the anode lead 132 made of nickel was welded to one end of the anode current collector 134A. Subsequently, the cathode 133, the separator 135 made of a microporous polyethylene film having a thickness of 23 μm, the anode 134, and the separator 135 were layered in this order and spirally wound in the longitudinal direction. After that, the end section of the wound body was fixed by the protective tape 137 made of an adhesive tape, and therefore a wound body as a precursor of the wound electrode body 130 was formed. Subsequently, the foregoing wound body was sandwiched between the package members 140 made of a 3-layer laminated film (total thickness: 100 μm) in which a nylon film (thickness: 30 μm), an aluminum foil (thickness: 40 μm), and a non-stretch polypropylene film (thickness 30 μm) were layered from the outside. After that, outer edges other than an edge of one side of the package members were thermally fusion-bonded with each other. Thereby, the wound body was contained in the package members 140 in a pouched state. Subsequently, the electrolytic solution was injected into the package member 140 through the opening thereof, the electrolytic solution was impregnated in the separator 135, and therefore the wound electrode body 130 was formed. Finally, the opening of the package member 140 was sealed by thermal fusion bonding in the vacuum atmosphere, and therefore the laminated film type secondary battery was completed. In manufacturing the secondary battery, the thickness of the cathode active material layer 133B was adjusted, and therefore lithium metal was prevented from being precipitated on the anode 134 at the time of full charge.

Example 10-2

A secondary battery of Example 10-2 was fabricated in the same manner as that of Example 1-3, except that the battery can 111 made of aluminum was used instead of the battery can 111 made of iron.

The cycle characteristics (discharge capacity retention ratio) for the secondary batteries of Examples 10-1 and 10-2 were examined. The results illustrated in Table 10 were obtained. Table 10 also illustrates the result of Example 1-3.

TABLE 10

| Battery structure | Metal element | Silicon content (%) A | B | A/B | Thickness (μm) C | D | C/D | Discharge capacity retention ratio (%) |
|---|---|---|---|---|---|---|---|---|
| Example 10-1 | Laminated film type | Ni | 90 | 80 | 1.13 | 0.4 | 0.2 | 2 | 75 |
| Example 10-2 | Square type (aluminum) | Ni | 90 | 80 | 1.13 | 0.4 | 0.2 | 2 | 79 |
| Example 1-3 | Square type (iron) | Ni | 90 | 80 | 1.13 | 0.4 | 0.2 | 2 | 84 |

As illustrated in Table 10, the discharge capacity retention ratio of the square type secondary battery (Examples 10-2 and 1-3) was higher than that of the laminated film type secondary battery (Example 10-1). In particular, the discharge capacity retention ratio of Example 1-3 in which the package member (battery can 111) was made of iron was higher than that of Example 10-2 in which the package member (battery can 111) was made of aluminum. Accordingly, it was confirmed that to further improve the cycle characteristics, the square type battery structure was better than the laminated film type battery structure. In addition, it was confirmed that to furthermore improve the cycle characteristics, the package member made of iron was preferably used. Although not illustrated with a specific example, it is evident that similar results would be obtained in a cylindrical type or a coin type secondary battery in which the package member is made of a metal material, since the cycle characteristics in the square type secondary battery in which the package member was made of a metal material were more improved than those of the laminated film type secondary battery.

From the results of the foregoing respective examples, it was found that according to the lithium ion secondary battery, structural break of the anode active material layer having a laminated structure is inhibited, and contact characteristics between each layer in the laminated structure were improved, and thus the cycle characteristics thereof were superior.

The description has been given of the case that the anode capacity is expressed based on inserting and extracting lithium ions. However, the secondary battery is not limited thereto. The embodiments are able to be similarly applied to a secondary battery in which the anode capacity includes the capacity due to inserting and extracting lithium ions and the capacity due to precipitation and dissolution of lithium metal, and the anode capacity is expressed by the sum of these capacities. In this case, an anode material capable of inserting and extracting lithium ions is used as an anode active material, and the chargeable capacity of the anode material is set to a smaller value than the discharge capacity of the cathode.

Further, the description has been given of the case in which the battery structure is the cylindrical type, the laminated film type, or the square type, and of the case in which the battery element has the wound structure. However, the battery structure is not limited thereto, but the embodiments are able to be similarly applied to a case that the battery structure is a coin type or a button type, or a case that the battery element has a laminated structure or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anode for a lithium ion secondary battery comprising:
an anode active material layer in which a first layer and a second layer each consisting essentially of silicon and a metal element as an anode active material are alternately layered on an anode current collector, the first and second layers each having different compositions of the metal element, wherein conditional expression 1 is satisfied:

$$1.02 \leq A/B \leq 50 \qquad \text{Expression 1}$$

where A represents a silicon content ratio in the anode active material in the first layer, and B represents a silicon content ratio in the anode active material in the second layer,
wherein the silicon is contained in the anode active material in a form selected from the group consisting of: elemental silicon, a silicon compound, an alloy of silicon and mixtures thereof, and
wherein the metal element is selected from the group consisting of nickel, cobalt, iron, manganese, chromium, aluminum, magnesium, molybdenum, and combinations thereof.

2. The anode for a lithium ion secondary battery according to claim 1, wherein the silicon content ratio in the anode active material in the second layer ranges from 1.8 atomic % to 88 atomic % both inclusive.

3. The anode for a lithium ion secondary battery according to claim 1, wherein the following conditional expression 2 is further satisfied.

$$0.1 \leq C/D \leq 40 \qquad \text{Expression 2}$$

where C represents a thickness of the first layer, and D represents a thickness of the second layer.

4. The anode for a lithium ion secondary battery according to claim 1, wherein the anode active material layer is composed of a plurality of particles, and
the respective particles have a laminated structure composed of the first layer and the second layer.

5. The anode for a lithium ion secondary battery according to claim 1, wherein at least part of the anode active material layer is alloyed with the anode current collector in an interface with the anode current collector.

6. The anode for a lithium ion secondary battery according to claim 1, wherein ten point height of roughness profile Rz value of a surface of the anode current collector is from 1.5 μm to 6.5 μm both inclusive.

7. A lithium ion secondary battery comprising:
a cathode;
an anode; and
an electrolyte, wherein the anode has an anode active material layer in which a first layer and a second layer each consisting essentially of silicon and a metal element as an anode active material are alternately layered on an anode current collector, the first and second layers each having different compositions of the metal element,
wherein conditional expression 1 is satisfied:

$$1.02 \leq A/B \leq 50 \qquad \text{Expression 1}$$

where A represents a silicon content ratio in the anode active material in the first layer, and B represents a silicon content ratio in the anode active material in the second layer,
wherein the silicon is contained in the anode active material in a form selected from the group consisting of: elemental silicon, a silicon compound, an alloy of silicon and mixtures thereof, and
wherein the metal element is selected from the group consisting of nickel, cobalt, iron, manganese, chromium, aluminum, magnesium, molybdenum, and combinations thereof.

8. The lithium ion secondary battery according to claim 7, wherein the silicon content ratio in the anode active material in the second layer is from 1.8 atomic % to 88 atomic % both inclusive.

9. The lithium ion secondary battery according to claim 7, wherein the following conditional expression 2 is further satisfied.

$$0.1 \leq C/D \leq 40 \qquad \text{Expression 2}$$

where C represents a thickness of the first layer, and D represents a thickness of the second layer.

10. The lithium ion secondary battery according to claim 7, wherein the anode active material layer is composed of a plurality of particles, and
the respective particles have a laminated structure composed of the first layer and the second layer.

11. The lithium ion secondary battery according to claim 7, wherein the electrolyte contains 1,3-propene sultone.

12. The lithium ion secondary battery according to claim 7, wherein the electrolyte contains one or more of 4-fluoro-1,3-dioxolane-2-one (FEC), 4,5-difluoro-1,3-dioxolane-2-one (DEFC), vinylene carbonate (VC), and vinylethylene carbonate (VEC) as a solvent.

13. The lithium ion secondary battery according to claim 7, wherein the electrolyte contains an electrolyte salt containing one or both of lithium hexafluorophosphate ($LiPF_6$) and lithium tetrafluoroborate ($LiBF_4$).

14. The lithium ion secondary battery according to claim 7, wherein the electrolyte contains one or both of sulfobenzoic anhydride and sulfopropionic anhydride.

15. The lithium ion secondary battery according to claim 7, wherein a lithium insertion amount ratio per unit area of the anode in a state of full charge in relation to a lithium amount capable of being electrochemically inserted per unit area of the anode is from 20% to 80% both inclusive.

16. The lithium ion secondary battery according to claim 7, wherein the cathode includes a cathode active material a larger amount by weight of nickel than cobalt.

17. The anode for a lithium ion secondary battery according to claim 1, wherein the silicon content ratio in the anode active material in the first layer ranges from 70 atomic % to 90 atomic % both inclusive.

18. The lithium ion secondary battery according to claim 7, wherein the silicon content ratio in the anode active material in the first layer ranges from 70 atomic % to 90 atomic % both inclusive.

* * * * *